(12) United States Patent
Emanuel

(10) Patent No.: US 8,141,796 B2
(45) Date of Patent: Mar. 27, 2012

(54) LASER NOZZLE AND IODINE INJECTION FOR COIL

(75) Inventor: George Emanuel, Arlington, TX (US)

(73) Assignee: KSY Corporation, Arlington, TX (US)

( * ) Notice: Subject to any disclaimer, the term of this patent is extended or adjusted under 35 U.S.C. 154(b) by 188 days.

(21) Appl. No.: 10/658,569

(22) Filed: Sep. 9, 2003

(65) Prior Publication Data

US 2004/0050979 A1    Mar. 18, 2004
US 2005/0103904 A9    May 19, 2005

Related U.S. Application Data

(60) Provisional application No. 60/410,857, filed on Sep. 13, 2002.

(51) Int. Cl.
*F23D 11/10*    (2006.01)
(52) U.S. Cl. .......... 239/423; 239/135; 239/430; 372/55; 372/89; 372/701
(58) Field of Classification Search .................. 239/133, 239/134, 429, 430, 431, 418, 423–425, 135; 372/55, 58, 59, 89, 701
See application file for complete search history.

(56) References Cited

U.S. PATENT DOCUMENTS

| | | | | |
|---|---|---|---|---|
| 1,608,998 A | * | 11/1926 | Riiho | 239/133 |
| 2,613,999 A | * | 10/1952 | Sher et al. | 239/434 |
| 2,625,008 A | * | 1/1953 | Crook | 239/127.3 |
| 3,560,876 A | * | 2/1971 | Airey | 372/89 |
| 3,671,882 A | * | 6/1972 | Cool | 372/58 |
| 3,688,215 A | * | 8/1972 | Spencer et al. | 372/89 |
| 3,842,363 A | * | 10/1974 | Dobrzelecki et al. | 372/89 |
| 4,206,429 A | * | 6/1980 | Pinsley | 372/90 |
| 4,225,831 A | * | 9/1980 | Ault et al. | 372/81 |
| 4,319,201 A | | 3/1982 | Bush et al. | |
| 4,348,764 A | * | 9/1982 | Cavalleri et al. | 372/58 |

(Continued)

FOREIGN PATENT DOCUMENTS

EP    0 891 022 A1    1/1999

(Continued)

OTHER PUBLICATIONS

AIAA 94.2416, "Historical Perspectives of the Chemical Oxygen—Iodine Laser (COIL)," by P.V. Avizonis & K.A. Truesdell, 25$^{th}$ AIAA Plasmadynamics and Lasers Conference, Jun. 20-23, 1994, Colorado Springs, CO.

(Continued)

*Primary Examiner* — Christopher Kim
(74) *Attorney, Agent, or Firm* — Storm LLP; Paul V. Storm

(57) ABSTRACT

An improved nozzle and iodine injector system for use in a COIL are disclosed. The improved nozzle is a two-dimensional, minimum length nozzle with a curved sonic line. The iodine injection system utilizes a series of slender struts for iodine injection into the oxygen stream through a series of small orifices that are located along the base of each strut. The struts are located within the nozzle such that the need for a diluent gas for the iodine is reduced. The use of the nozzle and iodine injection system, particularly when combined with the SOG disclosed in U.S. patent application Ser. No. 10/453, 148, have the potential for yielding a highly efficient, high power, optically superior COIL device that is compact, scalable, can operate in space, and has good pressure recovery potential.

19 Claims, 6 Drawing Sheets

U.S. PATENT DOCUMENTS

| | | | |
|---|---|---|---|
| 4,787,091 A | | 11/1988 | Wagner |
| 4,961,200 A | | 10/1990 | Verdier et al. |
| 5,023,883 A | * | 6/1991 | Jacobs et al. ............... 372/56 |
| 5,199,041 A | * | 3/1993 | Schmiedberger et al. ...... 372/89 |
| 5,693,267 A | | 12/1997 | Beshore et al. |
| 5,870,422 A | | 2/1999 | Florentino et al. |
| 5,889,807 A | | 3/1999 | Cunningham et al. |
| 5,907,573 A | | 5/1999 | Ullman et al. |
| 6,072,820 A | * | 6/2000 | Dickerson ................... 372/51 |
| 6,315,221 B1 | * | 11/2001 | Goenka et al. ............ 239/589 |
| 6,377,600 B1 | | 4/2002 | Flegal |
| 6,501,780 B2 | * | 12/2002 | Carroll et al. ............... 372/55 |
| 6,690,707 B1 | * | 2/2004 | Dering et al. ............... 372/89 |

FOREIGN PATENT DOCUMENTS

GB     2 228 138 A     8/1990

OTHER PUBLICATIONS

AIAA 94-2421, "COIL Development in the USA" by K.A. Truesdell, C.A. Helms & G.D. Hager, 25th AIAA Plasmadynamics and Laers Conference, Jun. 20-23, 1994, Colorado Springs, CO.

AIAA 2000-2425, "High Mach Number, High Pressure Recovery COIL Nozzle Aerodynamic Experiments" by T.T. Yan, R.A. Dickerson, L.F. Moon & Y.C. Hsia, 31st AIAA Plasmadynamics and Lasers Conference, Jun. 19-22, 2002, Denver, CO.

"Gas, Chemical and Electrical Lasers and Intense Beam Control and Applications," by Santanu Basu, Steven J. Davis & Ernest A. Dorko, Proceedings of SPIE, Jan. 24-25, 2000, San Jose, CA.

"Computational Analysis of the Transonic Flow Field of Two-Dimensional Minimum Length Nozzles" by B.M. Argrow & G. Emanuel, *Journal of Fluids Engineering*, Sep. 1991, vol. 113.

"Performance of an Aerospace Plane Propulsion Nozzle" by Y.Y. Bae & G. Emanuel, *Journal of Aircraft*, vol. 28, No. 2, Feb. 1991.

"Comparison of Minimum Length Nozzles" by B.M. Argrow & G. Emanuel, *Journal of Fluids Engineering*, Sep. 1998, vol. 110.

"Design of Nozzle Contraction for Uniform Sonic Throat Flow", T.-L. Ho & G. Emanuel, *AIAA Journal*, vol. 28, No. 4 Technical Notes.

"Gasdynamics: Theory and Applications" by George Emanuel, *AIAA Education Series*, 1986.

Handbook of Chemical Lasers, Ch. 5 "Gas Dynamics of Supersonic Mixing Lasers," G. Grohs & G. Emanuel, TRW Systems Group, 1976.

Analytical Fluid Dynamics, Second Edition, George Emanuel, Professor, Department of Mechanical and Aerospace Engineering, University of Texas, Arlington, dated 2001.

* cited by examiner

FIG. 1

LASER NOZZLE AND IODINE INJECTION FOR COIL

CROSS REFERENCE TO RELATED APPLICATIONS

The present application claims priority to U.S. Provisional Application Ser. No. 60/410,857, filed on Sep. 13, 2002.

TECHNICAL FIELD

The present invention relates generally to an improved laser nozzle and iodine injection system for use with a chemical oxygen-iodine laser (COIL). Particularly, in combination with a preferred singlet oxygen generator (SOG), as described in U.S. patent application Ser. No. 10/453,148 the laser nozzle and iodine injection system deliver to a downstream laser optical cavity a gas mixture with superior properties compared to prior art systems, improved laser efficiency, power per unit nozzle exit area, pressure recovery, and beam quality. As is the case with the above preferred SOG, the nozzle and iodine injection system are compact and scalable.

BACKGROUND OF THE INVENTION

The invention relates to an improved laser nozzle and iodine injection system for use with a COIL to improve the pressure recovery, efficiency, power per unit nozzle exit area, and optical quality of the laser beam. A COIL involves a number of subsystems, including a singlet oxygen generator (SOG), a supersonic nozzle for the transport of the singlet delta oxygen, $O_2(^1\Delta)$, and an iodine delivery and injection system. In addition, a COIL typically includes an optical cavity, as well as feed and spent fluid systems and a pressure recovery system.

U.S. patent application Ser. No. 10/453,148, incorporated herein by reference, discloses a new approach for a SOG. This device has many significant advantages over current SOG technology. These advantages include high pressure operation without requiring a diluent gas; a high $O_2(^1\Delta)$ yield; a compact and scalable configuration that is part of the laser nozzle's plenum; and the ability to operate in space. A nozzle and iodine injector according to the present invention are especially suitable for this SOG apparatus, referred to herein as the preferred SOG, although the nozzle and/or the iodine injector may be utilized with other SOG devices. The nozzle and iodine injection system of the present invention, particularly when combined with the preferred SOG, increase the performance of the COIL. It is preferred to use the nozzle, iodine injection system and preferred SOG in combination. While the nozzle and iodine injector of the invention are separate devices and are each capable of use with other nozzle or iodine injection designs, they are closely related since iodine injection occurs inside the nozzle.

Various nozzle and iodine injection configurations for COIL lasers are known in the prior art. For instance, it is known to use vertically oriented struts to form a two-dimensional array of converging/diverging nozzles for the oxygen-bearing stream (see FIG. 12c in Avizonis, P. V. and Truesdell, K. A., "Historical Perspectives of the Chemical Oxygen-Iodine Laser (COIL)," AIAA 94-2416 (1994)). Iodine is transversely injected into an oxygen stream through a series of small orifices located well upstream of the nozzle throat and from both sides of the struts. The manifolding for the iodine, which typically contains helium or nitrogen as a carrier gas, is internal to each strut. It is also known to use a single nozzle for the oxygen-containing stream. Again, the iodine is typically injected through small orifices that are located upstream of the nozzle throat in the upper and lower nozzle walls.

It is also known in the prior art to use vertically oriented struts located in a single sonic nozzle for the oxygen-containing stream. These struts are typically 1.7 inches (4.35 cm) long in the streamwise direction. From the base of the struts, a Mach 5 flow containing a mixture of nitrogen and iodine is injected into the low stagnation pressure oxygen-bearing stream. The nitrogen/iodine flow accelerates this stream and acts as the primary fluid in an ejector. As an ejector, the recovered pressure is significantly higher than the stagnation pressure of the oxygen stream, which is the secondary ejector fluid. Large tabs with alternating directions are placed at the downstream edges of the struts to generate vorticity, thereby enhancing the rate of mixing.

In U.S. Pat. No. 5,870,422, the iodine must be heated to about 400° F. (478 K) in the manifolding and in the injection lines in order to avoid iodine condensation that can plug injection ports. Moreover, transverse injection requires considerable momentum for the individual iodine jets in order to penetrate the oxygen stream. Because the molar flow rate of iodine is small compared to the oxygen, the momentum requirement, in turn, becomes a requirement for a larger mass flow rate of the jet; hence, the use of helium or nitrogen.

It is also known in the prior art to use a straight sonic line minimum length nozzle (MLN) in a gas dynamic laser. U.S. Pat. No. 4,348,764 (the '764 patent) discloses a nozzle construction for an HF or DF chemical laser. Struts are used for the injection of fuel in the diverging section of an oxidizer nozzle. The strut function and the design of the present invention are different from that disclosed in the '764 patent. According to the preferred embodiment of the present invention, iodine is injected through holes, or a slit, and the leading edge of a strut is shaped in a manner that helps reduce the aerodynamic disturbance to the surrounding supersonic flow. Also, in a COIL, iodine is neither a fuel nor an oxidizer, since COIL is a transfer laser.

Current COIL practice generally uses a single, conventional, two-dimensional nozzle for the oxygen stream. The supersonic portion of the nozzle is lengthy, as measured by the exit-to-throat distance divided by the throat half height, and the wall contour in the throat region is smooth. This type of nozzle has a modest favorable pressure gradient, which is largest at the throat, and a rapidly thickening laminar boundary layer downstream of the throat.

The benefits of the preferred SOG are compromised by using it with current nozzle and iodine injection technology. A new nozzle approach; namely, a minimum length nozzle is required. By definition, a MLN is an inviscid flow design approach for a divergent nozzle whose length between the throat and the exit plane is a minimum and where the flow in the exit plane is uniform and supersonic. This type of nozzle can be two-dimensional or axisymmetric. Here, only the two-dimensional version is of interest. There are two sub-types; a nozzle with a straight sonic line or with a curved sonic line, where the curved line is a circular arc.

All MLN versions have a wall contour with a sharp corner at the throat. For the same specific heat ratio, throat dimension, and nozzle exit Mach number, MLNs are substantially shorter and possess a much larger favorable pressure gradient, just downstream of the throat, then a comparable conventional nozzle.

The length of a two-dimensional MLN with a straight sonic line is known to be shorter than a curved sonic line MLN. The difference, however, is rather small. Moreover, the curved sonic line version has several advantages over its straight sonic line counterpart. As is known, the sonic line in a conventional nozzle is roughly parabolic. The curved sonic line approximation is thus a more realistic approach than that of a straight sonic line. As discussed in T. L. Ho and G. Emanuel, "Design of a Nozzle Contraction for Uniform Sonic Throat Flow," AIAA J. 38, 720-723 (2000), it is quite difficult to design a converging nozzle section that ends with a straight sonic line. A lengthy nozzle section, upstream of the sonic line, is required. The short converging nozzle section, used here, is more compatible with a curved sonic line. Another factor is that a two-dimensional curved sonic line MLN possesses an exact analytical solution; it is the only MLN configuration where this is the case. Full advantage is taken of this feature in the subsequent presentation.

As mentioned, MLNs have been used in the gas-dynamic laser. Another successful application of particular interest is in a uranium isotope separation process. $U^{235}$ is separated from $U^{238}$ when the uranium is in the form of $UF_6$. In the nozzle's plenum, the $UF_6$, plus a carrier gas, is at room temperature. A MLN is then used to avoid condensation of the highly supersaturated $UF_6$, where the degree of supersaturation is well in excess of a temperature decrease of 100 K. This is possible because of the very rapid MLN flow expansion that is free of disturbances, such as weak shock waves. The high degree of supersaturation, available with an MLN, is useful for COIL. It assists in preventing the water vapor and any other condensables, that emanate from the SOG, from condensing inside the nozzle or downstream in the laser cavity.

The temperature decrease from the plenum to the throat of a supersonic nozzle is modest. As a consequence, the onset of condensation in a supersaturated gas, co-flowing with a diluent, typically occurs shortly downstream of the throat. Suppression of condensation is enhanced by a very rapid expansion, in this region, in a flow free of disturbances. An MLN, with a sharp corner at the throat yields such an expansion, in contrast to a conventional nozzle. Suppression of condensation downstream of the MLN throat expansion is further enhanced by the short length of the nozzle, achieved without compromising the uniformity of the flow in the exit plane.

SOG devices produce water vapor as a byproduct of the exothermic chemical reactions that occur in the BHP/chlorine mixture, although the amount of water vapor produced is decreased in the preferred SOG. Water vapor is a known deactivator in COIL. Its principle effect is the deactivation of vibrationally excited $I_2$. The vibrationally excited iodine, $I_2^*$, is an intermediary in the production of atomic iodine, which is an essential laser ingredient. The first step in the generation of $I_2^*$ is the binary reaction

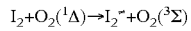

where $O_2(^3\Sigma)$ is electronic ground state oxygen. The importance of the deactivation process

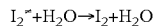

depends on the local concentrations of $O_2(^1\Delta)$, $I_2$, and $H_2O$. By injecting the iodine upstream of the throat, where concentrations of singlet oxygen and $H_2O$ are relatively high and the flow speed is small, prior art devices typically have a disproportionately large deactivation effect due to $H_2O$ vapor. As a consequence, it is typical in the prior art to have a water vapor removal system between the SOG and the laser nozzle. The method and location of the iodine injection system, therefore, has laser system implications that go beyond just the nozzle and iodine injection system.

None of the above prior art approaches achieve the improved characteristics of the nozzle and iodine injection system of the invention. In these prior art systems, the nozzle used is a conventional one based on a numerical method-of-characteristic design procedure, with or without a wall boundary-layer correction. The prior art method of iodine injection yields regions with excess, or too little, iodine and the pressure recovery potential is poor. With the prior art ejector approach, the rate of mixing is relatively slow. This is important since the iodine first must be dissociated by the excited oxygen before iodine atoms can lase as a result of energy transfer from the singlet delta oxygen. The tabs, previously mentioned and introduced to enhance the rate of mixing, result in a disturbed flow inside the optical cavity.

SUMMARY OF THE INVENTION

The present invention provides an improved nozzle and iodine injection system for use with a COIL. As in prior art COIL systems, the COIL of the present invention involves a number of subsystems, including a SOG, a supersonic nozzle for the transport of the $O_2(^1\Delta)$, and an iodine delivery and injection system. The laser nozzle of the present invention is a minimum length nozzle (MLN). Iodine is injected according to the present invention through a series of slender and small injection struts that are located inside the divergent part of the nozzle. These features permit the COIL to be readily scaled in a direction along the beam as well as in a direction transverse to the beam and to the flow.

Prior art COILs typically use a single, two-dimensional nozzle for delivery of the oxygen stream. Iodine is then injected into the oxygen stream from the walls of the nozzle or transversely from struts. In either case, the iodine is injected well upstream of the oxygen nozzle's throat. Many of the advantages and benefits of the preferred SOG are partly lost with prior art nozzle technology for COILs. The use of a two-dimensional MLN with a curved sonic line according to the invention takes full advantage of the benefits of this preferred SOG design.

A two-dimensional, minimum length nozzle with a curved sonic line has a number of advantages over both conventional nozzles and other types of minimum length nozzles. Its principal features are:

(i) an arbitrary shape for the converging section that allows this nozzle section to satisfy other COIL requirements such as a very short distance for the $O_2(^1\Delta)$ to reach the throat of the nozzle,
(ii) scalability,
(iii) compatibility with the iodine injection system of the present invention, although the nozzle may be used with other iodine injection systems,
(iv) a circular arc sonic line that approximates actual sonic lines of converging/diverging nozzles,
(v) a relatively thin boundary layer throughout the nozzle,
(vi) a relatively short length for the diverging nozzle section that does not require truncation,
(vii) inhibits condensation of condensable vapors, and
(viii) an exact analytical solution.

The iodine injection system of the invention utilizes a series of slender and small struts that are manifolded, preferably from both ends, for iodine vapor with, or without, a carrier gas. The electrically heated iodine vapor is injected into the oxygen stream through a series of small orifices that are located along the downstream base of each strut. Injection is in the downstream direction and the pressure disturbance caused by the struts and the injection process is minimal. Moreover, the disturbances decay in the downstream direction. The struts are preferably located at or near point B, as depicted in FIG. 1. A downstream strut location tends to reduce water vapor deactivation of vibrationally excited iodine. The struts are coated, preferably with Teflon or a similar material, to reduce deactivation of excited oxygen and reduce the heat transfer between the strut and the oxygen flow. The struts can be modified to rapidly produce a relatively uniform iodine layer in the wake of each strut. The strut location, the spacing between struts, and the optical cavity pressure all can be adjusted to yield proper transverse mixing and diffusion between the iodine and oxygen gases as they flow into and through the optical cavity.

A carrier gas, preferably helium, is useful for handling in the feed lines and manifolding a small iodine flow rate. Moreover, a carrier gas provides separation between iodine molecules thereby inhibiting iodine dimerization.

One overall goal of the combined preferred SOG, nozzle, and iodine injection system is to efficiently produce an infrared laser beam of high optical quality, i.e., a beam that is nearly diffraction limited. An approach toward achieving this goal is to use the previously mentioned SOG in conjunction with a nozzle/iodine injector that can produce a gaseous flow inside the optical cavity with the following characteristics:

(i) a nearly uniform supersonic velocity flow field,
(ii) thin wall-boundary-layers,
(iii) low density,
(iv) iodine vapor that is nearly uniformly distributed inside the oxygen stream, except in the wall boundary layers,
(v) reduce the concentration gradients of the iodine vapor, especially in any direction transverse to the laser beam's direction, and
(vi) a flow with good pressure recovery potential.

The nozzle and iodine injector of the present invention, particularly in combination with each other and with the preferred SOG, results in optimization of the above criteria and the production of a laser beam with high optical quality. Also, when combined with the preferred SOG, the nozzle design and iodine injector of the invention yield a highly efficient, high power, optically superior COIL device that is compact, scalable, can operate in space, and has good pressure recovery potential.

BRIEF DESCRIPTION OF THE DRAWINGS

The accompanying drawings are incorporated into and form a part of the specification to assist in explaining the present invention. The drawings are intended for illustrative purposes only and are not intended as exact representations of the embodiments of the present invention. The drawings further illustrate preferred examples of how the invention can be made and used and are not to be construed as limiting the invention to only those examples illustrated and described. In these drawings, the same reference characters are used throughout the views to indicate like or corresponding parts. The various advantages and features of the present invention will be apparent from a consideration of the drawings in which:

FIG. 1 is a partial cross sectional, side view of an SOG, MLN, and strut according to one aspect of the invention; the device is scalable in a direction normal to the FIGURE;

FIGS. 6(a) and 6(b) are to-scale drawings of a nozzle for the nominal case according to the invention, wherein FIG. 6(b) shows nozzle wall points A' and B';

DETAILED DESCRIPTION

Figure 1:
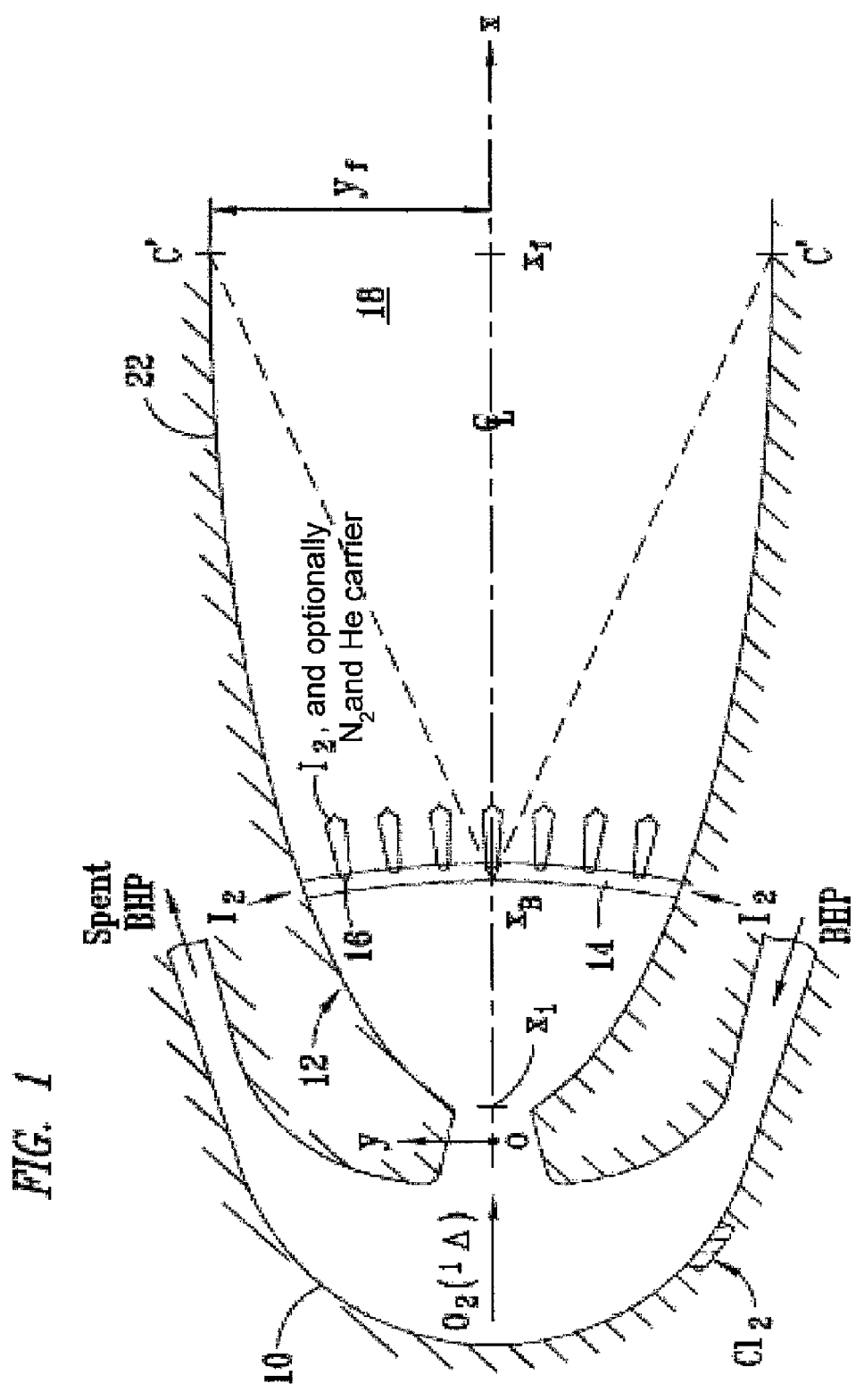
Figure 2:
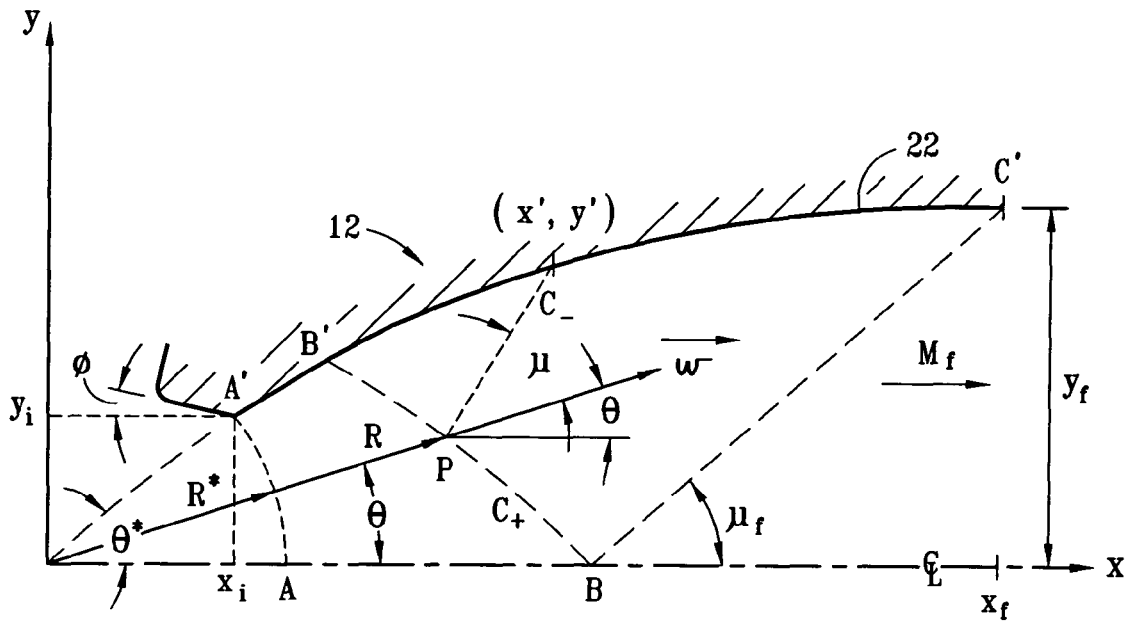
FIG. 2 is a graphical representation of an upper half of a symmetric, two-dimensional MLN with a curved sonic line according to one aspect of the invention.

The following describes the preferred embodiments of a nozzle and iodine injection system and their methods of use according to the present invention by reference to FIGS. 1-7. Although the preferred embodiments of the present invention are described, the description is not intended to limit the scope of the invention as defined by the claims. Some details of the COIL, nozzle, iodine supply system and SOG and their methods of use, including various gauges, fittings, piping, etc. are well known in the art, and as such are neither shown nor described. Even though numerous characteristics and advantages of the present invention are shown and described in the drawings and accompanying text, the description is illustrative only, and changes may be made, especially in matters of arrangement, shape and size of the parts, within the scope of the invention to the full extent indicated by the broad general meaning of the terms used in the claims.

Throughout this description, the prime superscript ' (prime) references the nozzle wall and the superscript*references the sonic line. The subscript "f" references the nozzle exit; the subscript "i" references the nozzle inlet; and subscript "j" references a wall point.

FIG. 1 is a partial cross sectional, side view of a preferred SOG, MLN, and iodine injection strut for a COIL according to the invention. Basic hydrogen peroxide (BHP) and chlorine ($Cl_2$) are fed into SOG 10 along a concave curved wall. The BHP and chlorine mix and react to produce singlet delta oxygen, which departs the reactant solution on the side opposite the concave curved wall to enter into MLN 12, as described in U.S. patent application Ser. No. 10/453,148. MLN 12 is preferably a two-dimensional, minimum length nozzle with a curved sonic line. Iodine is injected into MLN 12 through a series of struts, as shown by strut 14. Strut 14 is preferably located in MLN 12 between points $x_i$ and $x_f$, and most preferably between points B and $x_f$, where point B has the coordinate $x_B$ and $y_B=0$. Strut 14 contains orifices 16 through which the iodine is injected into the singlet delta oxygen stream, where oxygen excites the iodine for lasing as the stream moves beyond the exit plane of MLN 12 at $x_f$ and into laser cavity 18. The height (in the y direction) of strut 14 between nozzle wall 22 is typically between 2 cm to 50 cm, but varies according to the height, y, of the nozzle. Preferably, additional struts are located adjacent to strut 14 in the direction into and out of the page of FIG. 1, as seen in the top view of struts in FIG. 4(a). The nozzle exit plane is at $x_f$, between wall points C'. The upstream edge of the laser optical cavity may be slightly upstream, downstream or at the nozzle exit plane. The throat of the MLN is at location $x_i$ and the divergent part of the nozzle has a length $x_f-x_i$. The throat of the nozzle is located in a transition section located between the upstream converging nozzle wall and downstream wall 22. The transition section is preferably a sharp corner, but may be rounded. Iodine preferably enters strut 14 from both ends and exits in the downstream direction through orifices 16.

FIG. 2 is a graphical representation of an upper half of a symmetric, two-dimensional MLN 12 with a curved sonic line according to one aspect of the invention. By definition, a MLN is an inviscid flow design approach for a divergent nozzle whose length between the throat (located at $x_i$) and the exit plane (located at $x_f$) is a minimum and where the flow in the exit plane is uniform and supersonic. This type of nozzle can be two-dimensional or axisymmetric. The MLN 12 according to the invention is two-dimensional. There are two sub-types; a nozzle with a straight sonic line or with a curved sonic line, where the curved line is a circular arc.

Although other SOGs may be used with the nozzle and iodine injection system of the invention, the preferred embodiment of the invention utilizes the SOG described in U.S. application Ser. No. 10/453,148, which is incorporated herein by reference. This SOG is referred to herein as the "preferred SOG." The preferred SOG does not require a diluent gas and produces a gas largely consisting of $O_2(^1\Delta)$, some $O_2(^3\Sigma)$ and $O_2(^1\Sigma)$ (created by collisional deactivitation), a small mole fraction of $H_2O$ vapor, and a very small, if any, mole fraction of chlorine vapor. In the subsequent modeling, for purposes of convenience, the gas is assumed to be pure oxygen with a ratio of specific heats γ of 1.4 and a molecular weight W of 32.

The length of a two-dimensional MLN with a straight sonic line is observed to be shorter than a curved sonic line MLN. The difference, however, is rather small; eg., when $M_f$ (Mach number at the exit plane)=3 and γ=1.4, it is less than 5%. Moreover, the curved sonic line version has several advantages over its straight sonic line counterpart. As is known in the art, the sonic line in a conventional nozzle is roughly parabolic. The curved sonic line approximation is thus a more realistic approach than that of a straight sonic line. It is difficult to design a converging nozzle section that ends with a straight sonic line. A long nearly constant cross-sectional area convergent nozzle, upstream of the sonic line, is required. The short converging nozzle section according to the invention is more compatible with a curved sonic line. The subsonic streamlines stemming from the BHP layer on the concave wall of the SOG readily negotiates the nozzle's entrance section, without boundary-layer separation. When these streamlines accelerate into the diverging section, a roughly parabolic sonic line forms. Additionally, a two-dimensional curved sonic line MLN possesses an exact analytical solution; it is the only MLN configuration where this is the case. Aside from its minimum length, and a clean supersonic flow at the nozzle's exit plane, the boundary layer (laminar or turbulent) along the wall 22 is quite thin (as demonstrated later) under the high-pressure flow conditions of the preferred SOG. Finally, a MLN can inhibit condensation of a vapor ($H_2O$ and $Cl_2$) whose mole fraction in a noncondensing gas is small.

Referring to FIG. 2, the sonic line of MLN 12 has a radius R* and extends from point A' at wall 22 to point A on the centerline (along the x axis). Any two-dimensional MLN whose exit Mach number, $M_f$, exceeds about 2.8 (when γ=1.4) has an initial straight wall section as shown in the line from A' to B' in FIG. 2. Since this Mach number is usually exceeded in the COIL of the present invention, a straight wall section is expected to occur. However, one of ordinary skill in the art would understand the minor modifications to the analysis herein necessary when this Mach number is not exceeded and there is not a straight wall section as described in Emanuel, G., "Gas Dynamics: Theory and Applications," Ch. 17, AIAA Education Series, Washington, D.C., 1986. This straight wall section is quite short relative to the overall length, $x_f-x_i$ of the diverging part of the nozzle, as shown later. The slope of the straight wall section is θ*, and along the sonic line a source flow is presumed whose virtual origin is the origin of the x,y coordinate system. The region encompassed by AA'B'BA is a non-simple wave, supersonic, source flow region, sometimes called the kernel region. The kernel terminates on the centerline at point B, whose position is denoted as $x_B$ (where $y_B=0$). The downstream boundary of this region, B'B, is a $C_+$ (right-running) Mach line. The BB'C'B region is a simple wave region that gradually compresses the flow. On the BC' C. Mach line, which is straight, the flow is uniform, parallel to the centerline, and has a design Mach number value of $M_f$. Excellent optical cavity flow conditions prevail downstream of the nozzle's exit plane.

Specified design parameters for a nozzle are:

$$\gamma, W, \mu_o, p_o, T_o, p_f, y_i, h$$

where γ is the ratio of specific heats for the gas through the nozzle; W is the molecular weight of the gas through the nozzle; $\mu_o$ is the stagnation value of the viscosity of the gas through the nozzle; $p_o$ and $T_o$ are the stagnation values of the pressure and temperature of the gas upstream of the nozzle in its plenum; $p_f$ is the pressure of the gas at the exit plane; $y_i$ is the nozzle half height at the throat; and h is the distance of the nozzle in the direction out of the page with reference to FIGS. 1 and 2.

Here, $\mu_o$ is the stagnation value of the viscosity, which is approximately given by the linear relation $$\mu_o = C_\mu T_o$$

and is only used to evaluate a characteristic nozzle Reynolds number. Most variables and parameters have their standard fluid dynamic definition. The nozzle's width is h, and selected quantities, such as the mass flow rate, $\dot{m}$, scale linearly with h. Oxygen values are used for γ, W, and $C_\mu$. A computer code was used to calculate values for $M_f$, $M_B$, $\dot{m}$, and to determine the nozzle geometry for a two dimensional MLN with a curved sonic line and a straight wall section according to the following equations. Again, one of ordinary skill in the art would understand the minor modifications to these equations and the analysis necessary when there is no straight wall section, as described in Emanuel, G., "Gas Dynamics: Theory and Applications," Ch. 17, AIAA Education Series, Washington, D.C., 1986, incorporated herein by reference.

Nozzle Exit Flow Conditions $$X(M) = 1 + \frac{\gamma - 1}{2} M^2$$

$$v(M) = \left(\frac{\gamma + 1}{\gamma - 1}\right)^{1/2} \tan^{-1}\left[\left(\frac{\gamma - 1}{\gamma + 1}\right)^{1/2} (M^2 - 1)^{1/2}\right] - \tan^{-1}(M^2 - 1)$$

$$\alpha(M) = \frac{1}{M}\left(\frac{2}{\gamma + 1} X\right)^{(\gamma+1)/[2(\gamma-1)]}$$

$$M_f = \left\{\frac{2}{\gamma - 1}\left[\left(\frac{p_o}{p_f}\right)^{(\gamma-1)/\gamma} - 1\right]\right\}^{1/2}$$

$$\frac{T_f}{T_o} = X_f^{-1}$$

$$v_f = v(M_f)$$

$$\alpha_f = \alpha(M_f)$$

Equations for $\theta^*$ and $M_{B'}$ $$1 + (M_f^2 - 1)^{1/2} \alpha_f \sin\theta^* - \alpha_f \left[1 + \theta^*(M_f^2 - 1)^{1/2}\right] \cos\theta^* = 0$$

$$v(M_{B'}) - v_f \theta^* = 0$$

Nozzle Configuration $$\frac{R^*}{y_i} = \frac{1}{\sin\theta^*}$$

$$\frac{x_i}{y_i} = \frac{1}{\tan\theta}$$

$$\frac{x_f - x_i}{y_i} = \frac{\alpha_f}{\sin\theta^*}\left[1 + \theta^*(M_f^2 - 1)^{1/2}\right] - \frac{1}{\tan\theta^*}$$

$$\frac{y_f}{y_i} = \frac{\theta^* \alpha_f}{\sin\theta^*}$$

Mass Flow Rate $$\dot{m} = 2\left(\frac{2}{\gamma+1}\right)^{(\gamma+1)/[2(\gamma-1)]} \left(\frac{W\gamma}{RT_o}\right)^{1/2} p_o h R^* \theta^*$$

Wall Shape from Point A' to B' to C'

$$x_{A'} = y_i \cot\theta$$

$$y_{A'} = y_i$$

$$x_{B'} = y_i[1 + \alpha(M_{B'})\cot\theta^*]$$

$$y_{B'} = y_i \alpha(M_{B'})$$

$$M_j = M_{B'} + \left(\frac{M_f - M_{B'}}{N_1}\right)(j-1), \quad j = 1, 2, \ldots, N_1 + 1$$

$$\mu_j = \sin^{-1}\left(\frac{1}{M_j}\right)$$

$$\theta_j = v_f - v(M_j)$$

$$R_j = \frac{y_i \alpha(M_j)}{\sin\theta^*}$$

$$l_j = R_j M_j(\theta^* - \theta_j)$$

$$x_j = R_j \cos\theta_j + l_j \cos(\theta_j + \mu_j)$$

$$y_j = R_j \sin\theta_j + l_j \sin(\theta_j + \mu_j)$$

Generally, nondimensional values are actually tabulated, such as $R^*/y_i$ and $(x_i - x_j)/y_i$. In addition, (x,y) values for the A'B'C' wall are printed at closely spaced intervals. The wall shape for a nominal case is discussed below.

The $M_f$ Mach number is fully determined by $\gamma$ and $p_f/p_o$. In turn, the normalized wall shape, from B' to C', only depends on $\gamma$ and the local Mach number, $M_j$, at the wall location of interest. This Mach number is taken as $$M_j = M_{B'} + (j-1)\left(\frac{M_f - M_{B'}}{N_1}\right), \quad j = 1, 2, \ldots, N_1 + 1$$

where $N_1$ is set at 14 in the computer code. With this $N_1$ value, data is printed at 16 locations along the wall, including the A', B' and C' points.

The MLN solution does not establish the flow field upstream of A'A. At point A', the wall has a sharp corner. If the upstream wall slope in FIG. 2, $\phi$, is large, such as greater than 40°, the boundary layer at A' may separate from the wall, or a weak compression wave can be generated, at the wall, just downstream of point A'. This compression, or weak shock, is caused by the flow overexpanding as it flows past the sharp corner. To mitigate these disturbances, a small $\phi$ value of 10° to 25°, and preferably of about 10° to 15°, is used. The wall slope $\phi$ may be as much as 90°, but these smaller values are preferred. For typical operating conditions, this means the flow has an overall turn angle between 50° and 65°. Although it is preferred to use a sharp corner, some rounding can be introduced at the otherwise sharp corner.

Since the MLN solution is only for the nozzle's divergent section, the convergent section can be quite short; about $y_i/2$, as indicated in FIG. 2. The sonic line shape should still approximate a circular arc.

Because the MLN design is inviscid, it is valid only if the wall boundary layer is thin as shown later. A characteristic Reynolds number, Re, for a COIL nozzle is as follows:

$$R_g = \frac{\overline{R}}{W} = 259.84 \frac{J}{kg - K}$$

$$\mu_o = C_\mu T = 7.66 \times 10^{-8} T_o$$

$$\text{Re} = \frac{\rho_o (2h_o)^{1/2} y_i}{\mu_o} = \left[\frac{2\gamma}{(\gamma-1)R_g}\right]^{1/2} \frac{p_o y_i}{C_\mu T_o^{3/2}} = \frac{2.143 \times 10^6 p_o y_i}{T_o^{3/2}}$$

where $h_o$ and $\rho_o$ are the stagnation enthalpy and stagnation density of the gas in the nozzle.

For the boundary-layer analysis, a steady, locally similar, laminar boundary layer along the B'C' wall is assumed. In addition, a perfect gas is assumed, the Prandtl number and Chapman-Rubesin constant are taken as unity, and the external flow is homentropic. For convenience, the wall temperature equals $T_o$, which is also the plenum stagnation temperature.

For the cases discussed below in Table 2, this Reynolds number is about $6 \times 10^4$, (see Table 3), which is about an order-of-magnitude larger than prior art COIL nozzles, whose flow is relatively viscous and laminar. For the COIL laser nozzle of the present invention, however, the boundary layer is thin. The laminar boundary-layer displacement thickness, $\delta^*$, is thickest at the exit plane, point C' in FIG. 2. For the nominal case, $$\frac{\delta_f^*}{y_f} = 0.044$$

which verifies the thin boundary-layer assertion.

Additional equations for the displacement thickness and the laminar boundary-layer pressure gradient parameter, $\beta$, are as follows:

Pressure Gradient Parameter $$\overline{h} = stepsize = \frac{M_f - M_{B'}}{N_1 N_2}$$

$$M_k = M_{B'} + \left(\frac{M_f - M_{B'}}{N_1}\right)(k-1), \quad k = 1, 2, \ldots, N_1 N_2 + 1$$

-continued $$X(M) = 1 + \frac{\gamma-1}{2}M^2$$

$$I(M) = 2(M^2-1) + \frac{\gamma+1}{2}\frac{M^4}{(M^2-1)^{1/2}}[\theta^* - v_f + v(M)]$$

$$f(M_k) = \frac{I(M_k)}{M_k X_k^2}$$

$$\tilde{K}_j^{j+1} = \int_{M_j}^{M_{j+1}} f\, dM$$

$$= \overline{h}\left[\frac{1}{2}f_{(j-1)N_2+1} + f_{(j-1)N_2+2} + \ldots + f_{jN_2} + \frac{1}{2}f_{jN_2+1}\right],$$

$$j = 1, 2, \ldots, N_1$$

$$\tilde{K}(M) = \int_{M_{B'}}^{M} f(M)\, dM$$

$$\tilde{K}_1 = 0$$

$$\tilde{K}_j = \sum_{m=1}^{j-1} \tilde{K}_m^{m+1},\ j = 2, 3, \ldots, N_1+1$$

$$J(M_{B'}) = \ln\left[\frac{1}{M_{B'}}\left(\frac{2}{\gamma+1}X_{B'}\right)^{1/2}\right] + \frac{M_{B'}^2 - 1}{2X_{B'}}$$

$$\beta(M_j) = \frac{2X_j^2}{I(M_j)}[J(M_{B'}) + \tilde{K}_j],\ j = 1, 2, \ldots, N_1+1$$

Displacement Thickness Estimate $$g_w = \frac{T_w}{T_o} = 1$$

$$S(M) = \frac{(\gamma-1)M^2}{2X}$$

$$K = \left(\frac{2\gamma^2}{\gamma-1}\right)^{1/2}\left(\frac{2}{\gamma+1}\right)^{(\gamma+1)/[2(\gamma-1)]}\frac{p_o^2 y_i^2}{R_g T_o \text{Resin}\,\theta^*}$$

$$\beta(M) = \frac{2[X(M)]^2}{I(M)}[J(M_{B'}) + \tilde{K}(M)]$$

$$Y(M) = \frac{(\rho u)_e}{(2\xi)^{1/2}} = \left(\frac{\gamma}{R_g T_o}\right)^{1/2}\frac{M}{X^{(3-\gamma)/[2(\gamma-1)]}}\frac{p_o}{(KI\beta)^{1/2}}$$

$$Y\delta^* = \frac{1}{(1+S)(1+\beta)}\{Sf_w'' + [1 + (1-S)\beta][C_v - (1-g_w)C_t]\}$$

The boundary layer parameters $f_w''$, $C_v$, and $C_t$ are functions of $g_w$ and $\beta$, and are evaluated using Tables 5-7 (included below, from Tables 21.6, 21.2, and 21.3, respectively, found in Emanuel, G., *Analytical Fluid Dynamics*, Second Edit., CRC Press, Boca Raton, Fla., 2001). The boundary layer pressure gradient, $\beta$, is frequently evaluated by the computer code along the wall from B' to C'.

Because of the relatively large Reynolds number and the relatively small $\beta$ values, the boundary layer may be transitional or turbulent, rather than laminar. Nevertheless, the $\delta^*$ evaluation is still typical for a non-laminar boundary layer. When the boundary layer is turbulent, the actual value for $\delta^*$ is smaller than the corresponding laminar value.

Figure 3:
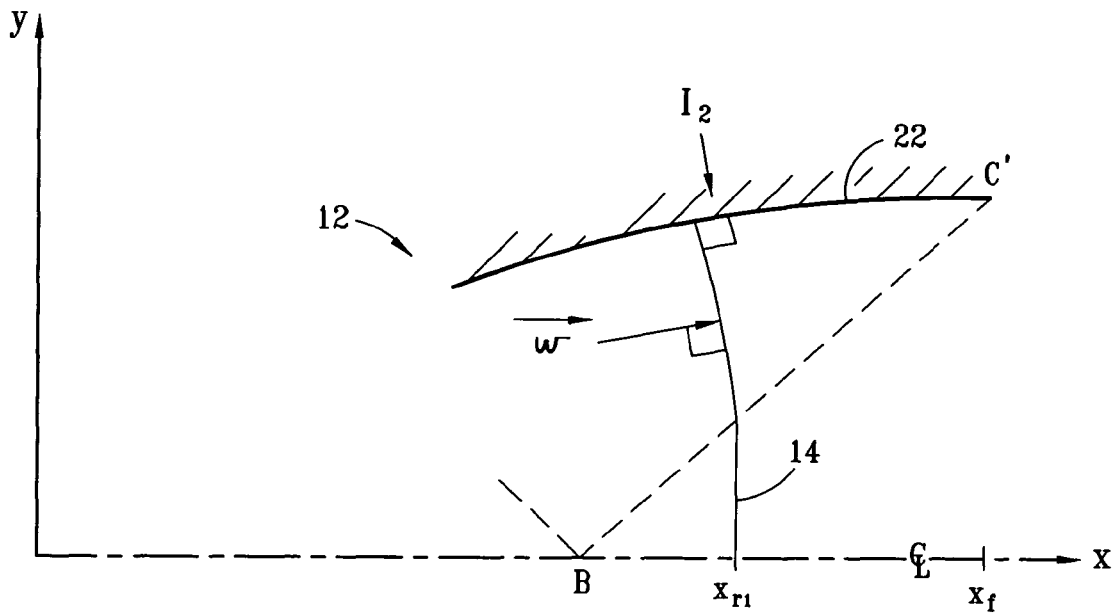
FIG. 3 is a graphical representation of a leading edge of a strut for iodine injection according to one aspect of the invention.
Figure 4:
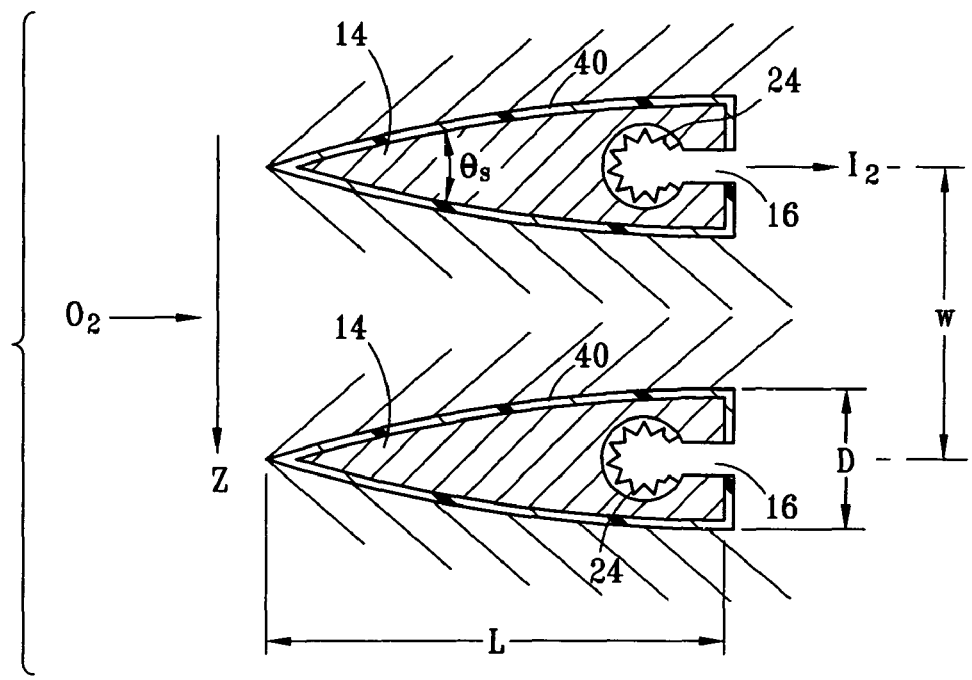
FIGS. 4(a), 4(b) and 4(c) are cross sectional top views of struts for iodine injection according to embodiments of the invention.
Figure 5:
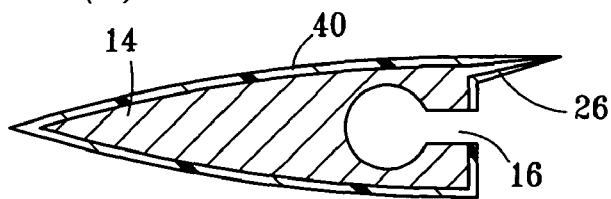
FIGS. 5(a) and (b) are cross sectional views of a strut for iodine injection including one or two small fins according to alternate embodiments of the invention.
FIG. 5(c) is a partial elevation view of the downstream side of a strut, depicting the base of the strut and the orifices in a strut for iodine injection according to one aspect of the invention in which the orifices are oval in shape.
Figure 5:
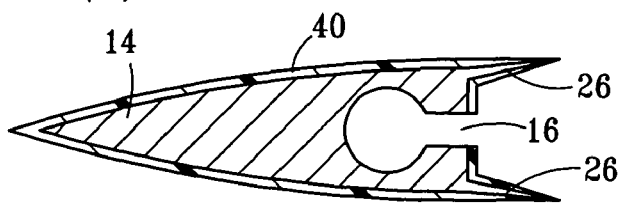
Figure 5:
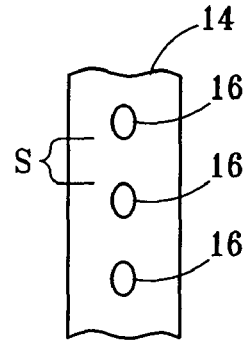
Figure 4:
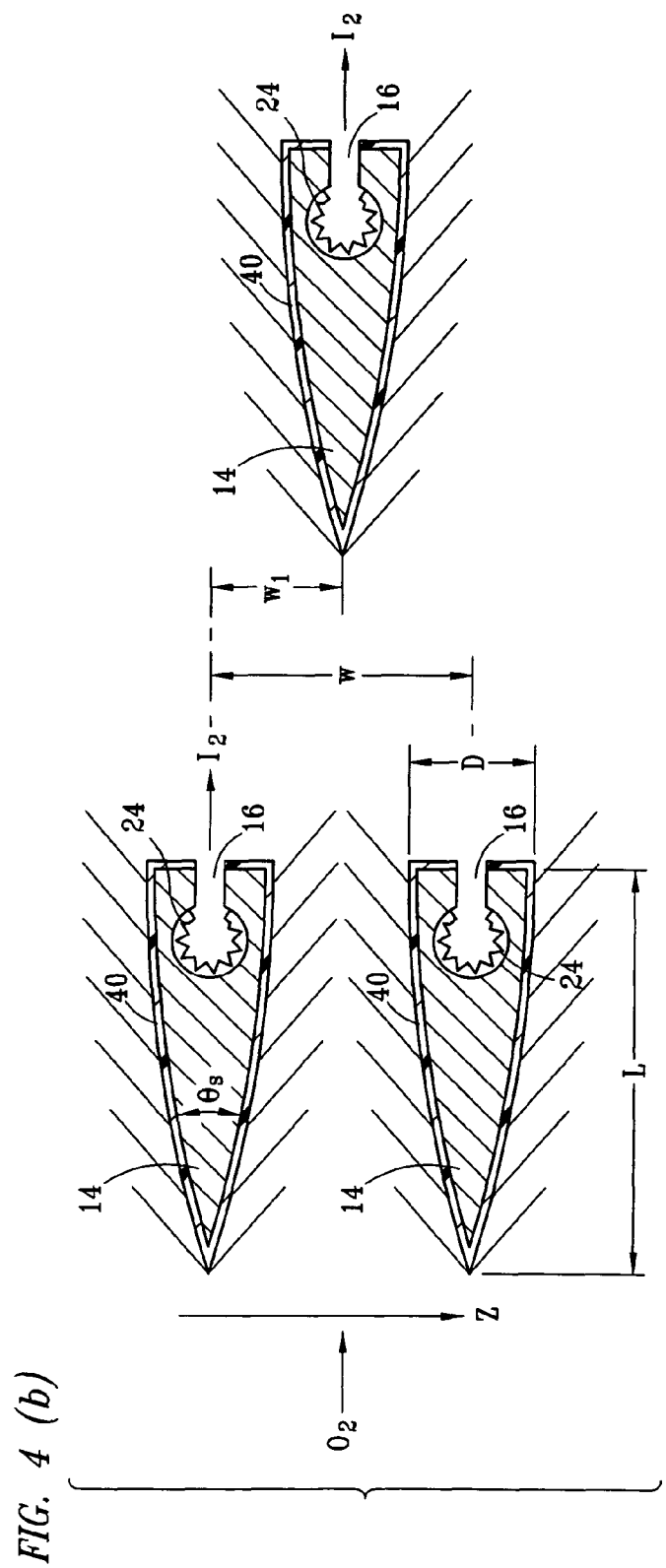
Figure 4:
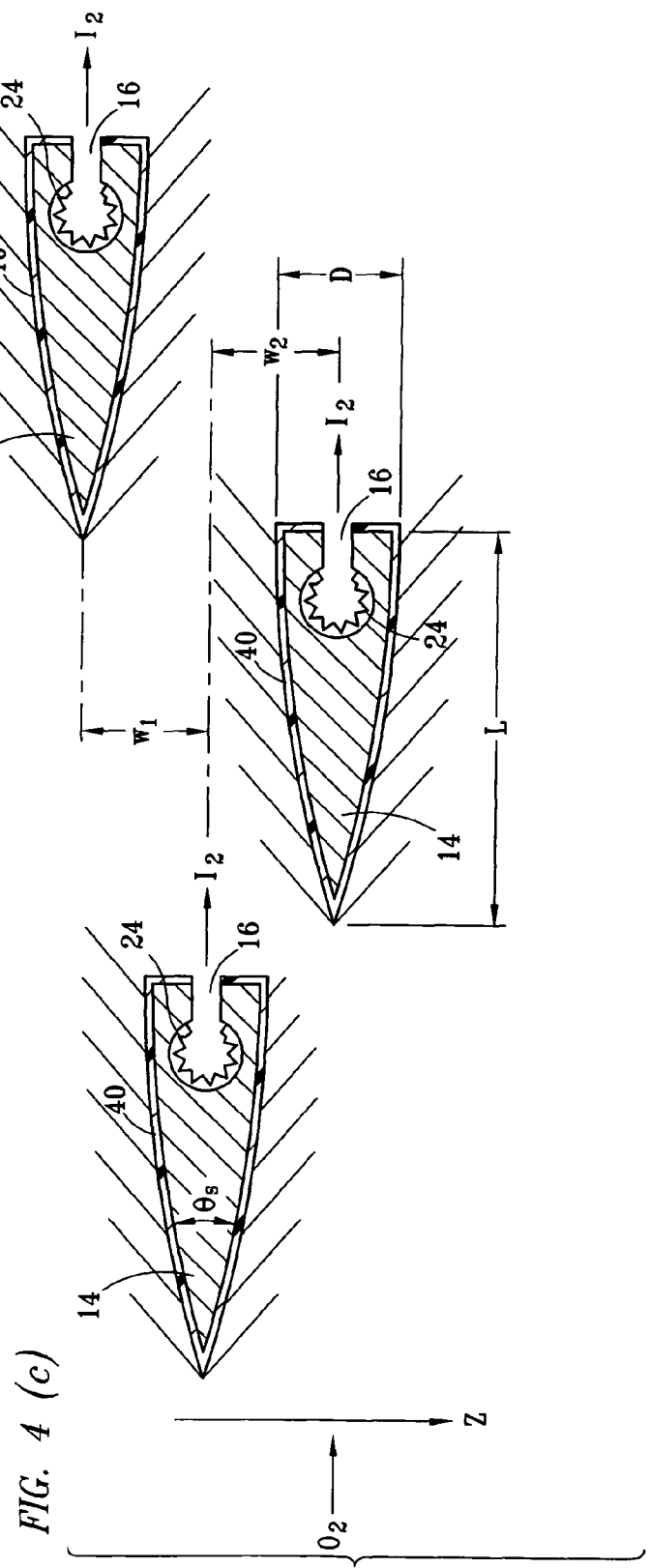

To achieve an efficient lasing process with good beam quality, the iodine vapor, with or without a carrier gas, is injected into the oxygen stream by means of a series of struts 14, each with multiple orifices 16 that are located along the base of the struts 14. Referring to FIGS. 3-5, various strut configurations for iodine injection are depicted. FIG. 3 depicts the leading edge of a strut in which the velocity is normal to this curve. The method for establishing the shape of the leading edge is given later. FIG. 4(a) shows two struts, in cross-sectional top view. The iodine flows through feed duct 20 and exits through orifice 16. The oxygen gas flow direction is shown as well as the optical direction, denoted as z in FIG. 4(a). The spacing between adjacent struts is w. A typical length in the direction of oxygen flow, L, for a strut would be about 1 cm with an angle $\theta_s$ (where $\theta_s$ refers to the angle on the strut) of 20° or less. The angle $\theta_s$ preferably ranges from 5° to 45°, and most preferably is around 20° or less. The struts have a coating 40 and have heater elements 24. Coating 40 may be Teflon, nylon, or other plastic material. FIG. 5 shows the possibility of using one or two small fins 26 or of using oblong orifices 16. The purpose of using fins or oblong orifices is to assist in the rapid formation of an iodine layer near the base of each strut if necessary or desired.

Only a few molar percent of iodine ($I_2$), perhaps 2-5%, relative to the total oxygen, is required. The molar flow rate of oxygen is nominally equal to the chlorine flow rate in the SOG. When handling a small iodine flow rate, it is useful to add a carrier gas, preferably helium. The presence of helium is also useful for separating iodine molecules thereby inhibiting iodine dimerization.

Prior to injection, stored liquid iodine is pressurized and vaporized. The manifolding requires electrical heating to at least 400 K to avoid condensation. The use of struts 14 according to the invention does not have an iodine jet momentum requirement, as is the case with prior art upstream transverse injection. According to the invention, the iodine flow, with or without diluent, preferably chokes at the injection ports or orifices 16. Choking is needed to provide accurate dispensing of the iodine, through each port or orifice of the struts. As is understood by those of ordinary skill in the art, the manifold feed pressure must be at least twice as large as the local oxygen stream pressure to ensure choking.

The struts 14 are positioned inside the laser nozzle 12 at $x_{r1}$, as depicted in FIG. 3. This location, $x_{r1}$, is generally between the throat and exit of the diverging part of the nozzle. Adequate flow time for transverse mixing and diffusion and for the dissociation of the iodine suggests an upstream strut location. A downstream strut location is used to reduce the deactivation effect of $H_2O$ and to reduce the iodine manifold feed pressure. A preferred location for $x_{r1}$, according to the invention, is at or near the downstream end of the kernel region, point B. Point B is generally between 10%-50% of the distance from $x_i$ to $x_f$.

Patent application Ser. No. 10/453,140, p. 29 provides flow rates for aqueous KOH, H2O, added water, and chlorine for a nominal case where the width of the preferred SOG and the width of the preferred nozzle, in the beam direction, is 1 meter. These flow rates and the 1 meter dimension are the bases of a nominal case for the preferred nozzle. It should be understood that the nominal case does not represent a minimum, maximum or optimum case. For the nominal case, discussed below, the nozzle 12 has the conditions:

$$M_b = M_f = 3.41,\ \frac{x_i}{y_i} = 0.9601,\ \frac{x_B}{y_i} = 8.617,$$

$$\frac{x_f}{y_i} = 31.22,\ p_B = p_f = 3\ Torr$$

while the pressure on the wall, where the leading edge of a strut 14 intersects the wall, is only 10 Torr. With strut 14 preferably located at about point B, after injection the iodine has a path length to the nozzle exit plane of at least about 11.0 cm for macroscale mixing and diffusion before reaching the nozzle exit plane. If this length is too large, the struts may be moved downstream. The pressure level at the base of a strut 14 is not significantly different from the undisturbed pressure, since the oxygen flow first passes through a weak oblique shock wave and then a corresponding expansion wave. Moreover, with base injection, a stagnation line does not occur along the base of the strut. After iodine exits an orifice 16, it forms a jet or plume that expands outward depending on the magnitude of the local pressure. It is preferred that the maximum diameter of the jet, in the direction of the optical axis, should not exceed the width D of the strut's base, which is about 0.3 cm wide, as seen in FIG. 4. This is readily done by adjusting the diameter and spacing, s, on FIG. 5(c), of the orifices 16 and is useful for minimizing disturbances, such as shock waves in the oxygen flow that might be caused by the iodine jets. These considerations result in a iodine feed pressure that need only exceed about 25 Torr. Increasing the iodine temperature rapidly increases its vapor pressure.

After injection, the diatomic iodine molecules are dissociated by collisional energy transfer from the singlet delta state of oxygen. After dissociation, collisions of the ground state iodine atoms with $O_2(^1\Delta)$ produces by resonant energy transfer, the electronically excited $I(^2P_{1/2})$ state that lases in the infrared at a wavelength of 1.315 µm. After an iodine atom looses its excitation, it may be repeatedly repumped by the large molar excess of $O_2(^1\Delta)$.

The iodine molecules, and then the atoms, go through two distinct collisional processes. The effectiveness of these processes requires that the iodine be well dispersed in the oxygen gas, and that there is adequate time, in a supersonic flow, for these processes to occur. In particular, it is advantageous if the dissociation process occurs upstream, and, if necessary, throughout the optical cavity, which typically starts near the exit plane of the nozzle.

An additional collision process is that between $I_2^*$ and $H_2O$. By introducing the iodine at the preferred location downstream of the nozzle throat according to the invention, the local concentrations are significantly reduced and the flow time for $I_2^*$ deactivation is also significantly reduced. These benefits, of course, are relative to prior art, conventional upstream-of-the-throat iodine injection. With the iodine injection of the present invention, $H_2O$ deactivation of $I_2$ is no longer a major factor. Another benefit of locating the struts 14 downstream of the throat $x_t$ according to the invention is the reduction in the iodine feed pressure and the possibility of operating without any carrier gas for the iodine.

Referring to FIG. 3, which is a graphical representation of a leading edge of a strut 14 for iodine injection according to one aspect of the invention, at the centerline, the edge is at $x_{r1}$, which is preferably located between points B and $x_f$. Although it is preferred that the edge be located between points B and $x_f$, and most preferably that it be located at or near point B, it may also be located upstream of point B according to the invention. It is preferred that each strut 14 be fed iodine, with or without added diluent, through a feed duct 20 at both ends of the strut 14, as indicated in FIG. 4. Iodine may also be fed to each strut 14 from only one end, but it is preferred to feed from both ends.

To reduce the aerodynamic disturbance created by the struts, the leading edge is locally perpendicular to the velocity, $\vec{w}$, of the oxygen stream. Strut sweep would cause additional undesirable disturbances near the walls and the centerline. Downstream of BC', the strut is normal to the centerline. In the BB'C'B region, however, the strut has a slight upstream-curving path.

Figure 7:
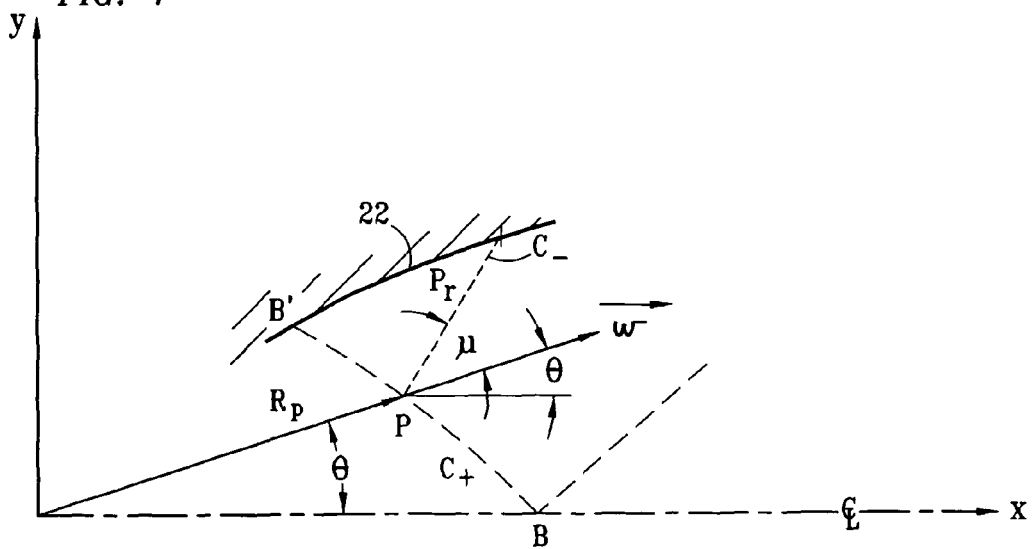
FIG. 7 is a schematic used in the derivation of the equations for the shape of the leading edge of a strut.

An arbitrary point on the leading edge of the injector strut 14 in the simple wave regions is denoted as $P_r(x_r, y_r)$ on FIG. 7. This point is on a straight $C_-$ characteristic, also as shown in FIG. 7. Along this characteristic, flow conditions are constant. Hence, the velocity, $\vec{w}$, Mach number, and velocity slope $\theta$, are the same at points P, $P_r$, and at the wall 22. The characteristic B'B bounds the simple wave region and the upstream cylindrical source flow region. For the source flow region:

$$R_P = R^* \alpha(M_P) = \frac{y_i}{\sin \theta^*} \alpha(M_P)$$

$$x_P = R_P \cos\theta, \quad y_P = R_P \sin\theta$$

while the simple wave region yields $$\theta = v_f - v(M_P) \qquad \text{Eqn. 1}$$

Since the $C_-$ characteristic is straight:

$$\frac{y_r - y_P}{x_r - x_P} = \tan(\theta + \mu_p) = \frac{(M_P^2 - 1)\tan\theta + 1}{(M_P^2 - 1)^{1/2} - \tan\theta}$$

Eliminate $x_P$ and $y_P$ and solve for $$z = \tan\theta$$

to obtain the quadratic equation $$az^2 + bz + c = 0 \qquad \text{Eqn. 2}$$

where $$p = y_r + (M_P^2 - 1)^{1/2} x_r$$

$$q = (M_P^2 - 1)^{1/2} y_r - x_r$$

$$a = R_P^2 - p^2 = (R^*)^2 \alpha_P^2 - p^2$$

$$b = 2pq$$

$$c = R_P^2 - q^2 = (R^*)^2 \alpha_P^2 - q^2$$

The appropriate solution of Eqn. 2 yields the flow angle along the $C_-$ characteristic $$\tan\theta = \frac{pq + R_P[M_P^2(x_r^2 + y_r^2) - R_P^2]^{1/2}}{p^2 - R_P^2} \qquad \text{Eqn. 3}$$

The streamline equation through point $P_r$ is $$\frac{dy_r}{dx_r} = \tan\theta$$

The equation for a curve that is normal to a streamline then is $$\frac{dx_r}{dy_r} = -\tan\theta \qquad \text{Eqn. 4}$$

Note that θ is given by Eqns. 1 and 3, and that θ also depends on the Mach number. The r and P subscripts can now be dropped, since conditions at the two points are the same (see FIG. 7). Equation 1 is differentiated to obtain $$d\theta = -\frac{(M^2-1)^{1/2}}{MX}dM \text{ and} \qquad \text{Eqn. 5}$$

Eqn. 3 is rewritten as $$\theta = \tan^{-1}\frac{N}{D} \qquad \text{Eqn. 6}$$

where $$N = \left[y + (M^2-1)^{1/2}x\right]\left[(M^2-1)^{1/2}y - x\right] + R^*\alpha[M^2(x^2+y^2) - (R^*)^2\alpha^2]^{1/2}$$

$$D = \left[y + (M^2-1)^{1/2}x\right]^2 - (R^*)^2\alpha^2$$

The slope θ is eliminated by differentiating Eqn. 6 and equating the results to Eqn. 5.

Two, first-order, coupled ordinary differential equations (ODEs) are obtained $$\frac{dx}{dy} = f_1(y, x, M)$$

$$\frac{dM}{dy} = f_2(y, x, M)$$

where (x,y) are the coordinates of a point on the leading edge of the injector strut in the B'BC'B' region and M is the Mach number at this point. It is convenient to use y as the independent variable, and $$f_1 = -\frac{N}{D}$$

$$f_2 = \frac{ND_y - DN_y + (DN_x - ND_x)\frac{N}{D}}{\frac{(M^2-1)^{1/2}(N^2+D^2)}{MX} - ND_M + DN_M}$$

Equations for X, α, p, q, N, and D have already been given, where these quantities only depend on y, x, and M. Equations for various partial derivatives are:

$$\alpha_M = \left(\frac{2}{\gamma+1}\right)^{(\gamma+1)/[2(\gamma-1)]}\frac{M^2-1}{M^2}X^{(3-\gamma)/[2(\gamma-1)]}$$

$$u = M^2(x^2+y^2) - (R^*)^2\alpha^2$$

$$N_x = (M^2-2)y - 2x(M^2-1)^{1/2} + \frac{R^*M^2\alpha x}{u^{1/2}}$$

-continued $$N_y = (M^2-2)x - 2y(M^2-1)^{1/2} + \frac{R^*M^2\alpha y}{u^{1/2}}$$

$$N_M = \frac{M}{(M^2-1)^{1/2}}\left[-x^2 + y^2 + 2xy(M^2-1)^{1/2}\right] + \frac{R^*}{u^{1/2}}\{M(x^2+y^2)\alpha + [u - (R^*)^2\alpha^2]\alpha_M\}$$

$$D_x = 2p(M^2-1)^{1/2}$$

$$D_y = 2p$$

$$D_M = \frac{2Mpx}{(M^2-1)^{1/2}} - 2(R^*)^2\alpha\alpha_M$$

The above two ODEs are solved with a fourth-order, Runge-Kutta scheme, subject to the following initial conditions $$x_o = x_{r1}$$

$$y_o = \frac{1}{(M_f^2-1)^{1/2}}\left(x_{r1} - \frac{y_i\alpha_f}{\sin\theta^*}\right)$$

$$M_o = M_f$$

where $y_o, x_o$ is a point on the BC' characteristic. The solution terminates when the B'C' wall is crossed.

Figure 6:
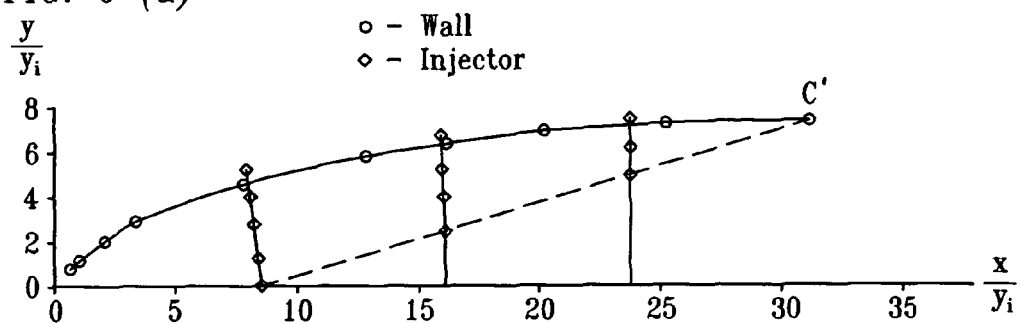
Figure 6:
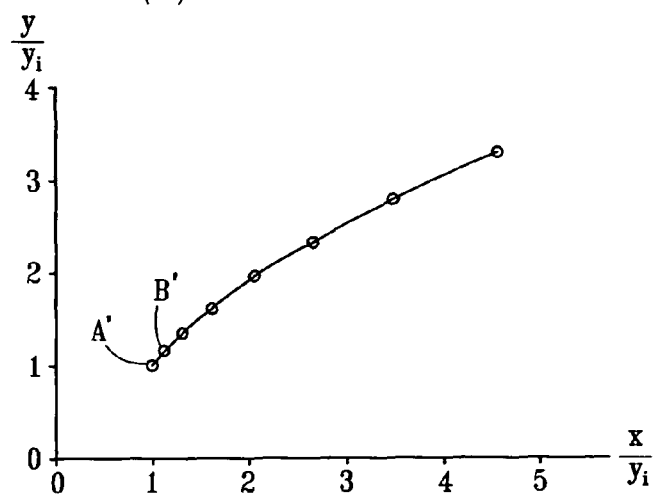

As shown in FIG. 6, these two, first-order, coupled ODEs are numerically solved using a fourth-order Runge-Kutta scheme to determine the coordinates of the path of the strut's leading edge in the BB'C'B region.

FIG. 4(a) is a cross sectional top view of two adjacent struts 14 for iodine injection according to one aspect of the invention. The upstream-facing surface of a strut is either a sharp wedge or a sharp ogive, with $\theta_s$ of 5° to 45°. The struts have a coating 40 and have heater elements 24. Coating 40 may be Teflon, nylon, or other plastic material. FIGS. 4(b) and 4(c) show cross sectional top views of alternate embodiments where the struts 14 are staggered. It is preferred to have the struts adjacent one another as shown in FIG. 4(a), but various configurations, including those in FIGS. 4(b) and (c), for staggering or alternating strut location may be used according to the invention. The iodine exits the strut 14 through a number of small orifices 16 that inject the iodine into the oxygen stream in a downstream direction. These orifices 16 are preferably spaced about a few millimeters apart throughout the height of the strut, as indicated by s on FIG. 5(c). The diameter of the orifices depends on the iodine mass flow rate, and the spacings w and s. Other shapes may be used for the orifices 16, such as oval or oblong orifices as shown in FIG. 5(c). A slit may also be used; however, hole-type orifices provide better control of the iodine distribution, downstream of the struts, as compared to the use of a slit. The cross-hatching inside iodine feed duct 20 indicates an electrical heating element 22. It is preferred to use a heating element 22 to prevent condensation of the iodine, although is necessary, the strut itself may be electrically heated. The outer surface of each strut 14 has a coating 40 to inhibit surface deactivation of the excited oxygen, and to reduce the heat transfer between the hot struts and the cold flow. Teflon is a preferred coating material, but other suitable materials, including nylon, may also be used.

The struts 14 are designed to reduce their disturbance of the surrounding, supersonic oxygen stream. This is done, in part, by keeping the slender strut's cross-sectional area as small as possible. For example, it is preferred that $\theta_s$ in FIG. 4 be about 15° to about 20° or less; L be about 1 cm or less. D is essentially determined by L and $\theta_s$.

Each strut has an attached bow shock wave that has a shallow angle and is weak because the $\theta_s/2$ angle is small, about 10° or less. Downstream of the bow shocks are expansion waves that gradually merge with the shocks and weaken them. The wave system attenuates as it travels downstream. The spacing, w, equal to ½ or up to a few centimeters, between adjacent struts should be sufficiently large such that a bow shock from one strut does not impinge on an adjacent strut, thereby causing boundary-layer thickening or separation. Spacing between staggered struts, such as $w_1$ and $w_2$, may be different than spacing w between adjacent struts. With use of the struts according to the invention, this is easily met since the bow shock wave angle is relatively small. Each strut produces a velocity wake that is weak because of the iodine injection. The wake also attenuates as it travels downstream.

Preferably, a combination of factors is utilized according to the invention to reduce the overall pressure disturbance in the laser cavity that would be caused by the struts and the iodine injection process. These are: (1) a sharp edged strut that is slender and has a small cross-sectional area; (2) adequate strut separation to avoid interference effects; (3) a strut leading edge that is normal to the velocity field; (4) base injection in which the maximum diameter of the iodine jet, in the optical axis direction z, does not exceed the width D, as shown in FIG. 4, of the strut's base; and (5) injection upstream of the exit plane of the nozzle. It is preferred to use each of these features in combination; however these features may be used singly or in any combination to improve iodine injection process.

There is a relatively steady, repetitive, weak disturbance of the density whose gradient is along the optical axis for the flow in the laser cavity. The effect of this disturbance on the phase of the optical beam can be removed by the optical system, if necessary. However, the gradient of the iodine atom vapor, transverse to the beam, is minimal.

Each strut, with or without iodine injection, has a downstream wake flow region that gradually attenuates as it spreads. The wakes of adjacent struts start to merge at a downstream location that depends on the strut spacing, w. Iodine injection alters, and weakens, the wake flow. An objective of the strut injection scheme of the present invention is to have the discrete iodine flows from the various orifices, per strut, rapidly merge with each other. If necessary, this is achieved with the use of one or two fins, oval orifices, and by reducing the spacing s. An iodine/oxygen layer is formed, downstream of each strut, as part of the strut's wake flow. This layer is expected to have a relatively uniform iodine concentration, in an x,y plane, before the layer enters the optical cavity, which is optically advantageous.

To assist, if necessary, in the rapid formation of an iodine-containing layer, one or two small fins 24 can be utilized, as shown in FIGS. 5(*a*) and 5(*b*), respectively. The exit shape of the orifices 16 can be an oval shape, as shown in FIG. 5(*c*).

Injection of iodine in this manner still requires mixing and diffusion of the iodine with the oxygen, transverse to the iodine-containing layers. The rate of this mixing and diffusion process is primarily governed by three factors: laser cavity pressure, location of the struts, and spacing between adjacent struts. Based on the results of experimental testing, each of these factors is adjustable to achieve sufficient iodine dispersion inside the optical cavity.

The first factor is the optical cavity pressure which is also the nozzle exit pressure. Because of the relatively large molecular weights of the I, $I_2$, and $O_2$ constituents, the rate of bimolecular diffusion is relatively slow. Diffusion coefficients, however, are inversely proportional to the pressure. Thus, a low cavity pressure is preferred. A pressure of 3 Torr (0.004 atm), or less, is preferred. Contrary to prior art practice with the HF/DF laser, the nozzle width, h, does not need to increase as the cavity pressure decreases. Remember that this device is scalable; h is determined by the desired laser power output.

The second factor is the upstream/downstream location of the struts, as specified by $x_{r1}$ on FIG. 3. The further upstream the struts are located, the more time there is for lateral mixing and diffusion. It is preferred that the $x_{r1}$ location be approximately at point B.

The last factor is the spacing, w, between adjacent struts, as shown in FIG. 4. Aside from setting the strut spacing, w, so that the wakes of adjacent struts rapidly merge at a downstream location, the spacing is generally arbitrary. Moreover, the overall disturbance level does not significantly increase as the number of struts 14, for a given nozzle width h, increases. This is because each strut 14, with its attached bow shock, has its own pressure field, irrespective of neighboring struts. This would not be the case if the oxygen flow were subsonic. As the strut spacing w decreases, the amount of injected iodine, per strut, also decreases, and the strut size can decrease.

A computer code may be used to perform most of the analytical calculations used in describing the present invention. Values for input parameters are chosen according to use with the preferred SOG. Values of fixed parameters are shown in Table 1, where γ, W, and C, are oxygen values. The values for h and $y_i$ are for the aforementioned nominal case. The subsequent discussion, exclusive of Tables 2 and 4, are for the nominal case. FIG. 6 shows the wall design and three possible strut locations for the nominal case.

TABLE 1

| Fixed Input Parameters | |
|---|---|
| h = | 1 m |
| $y_i$ = | $5.223 \times 10^{-3}$ m |
| γ = | 1.4 |
| W = | 31.999 kg/kmol |
| $C_\mu$ = | $7.66 \times 10^{-8}$ Pa-s/K |

Here, h is the width of the SOG and the attached nozzle (in the direction out of the page with respect to FIG. 1), and $y_i$ is the half-height of the nozzle's throat. Typical values for h range from a few centimeters up to 3-5 meters; with $y_i$ ranging from about 2 mm to about 5 cm; $y_f$ ranging from about 1.5 cm to 0.25 m; and $x_f$-$x_i$ ranging from 5 cm to 1 m. Four additional values then fix the calculation. These are the stagnation pressure and temperature, $p_o$ and $T_o$, the nozzle exit pressure, $p_f$, which is also the optical cavity pressure, and the location, $x_{r1}$, of the iodine injection strut. This last parameter does not affect the nozzle design.

Three values are used for each of the $p_o$, $p_f$, and $T_o$ parameters, as shown in Table 2, where 2.6+2 reads as 260. The pressure values, in Pascal and Torr, and various combinations for each case considered, are as follows:

TABLE 2

| $p_o$ | | $p_f$ | |
|---|---|---|---|
| Pa | Torr | Pa | Torr |
| 1.99984 + 4 | 150 | 133.322 | 1 |
| 2.66645 + 4 | 200 | 266.645 | 2 |
| 3.33306 + 4 | 250 | 399.967 | 3 |

TABLE 2-continued

| case | $p_o$, Pa | $p_f$, Pa | $T_g$, K |
|---|---|---|---|
| 300 | 1.99984 + 4 | 1.33322 + 2 | 2.6 + 2 |
| 303 | | | 2.8 + 2 |
| 306 | | | 3.0 + 2 |
| 310 | | 2.66645 + 2 | 2.6 + 2 |
| 313 | | | 2.8 + 2 |
| 316 | | | 3.0 + 2 |
| 320 | | 3.99967 + 2 | 2.6 + 2 |
| 323 | | | 2.8 + 2 |
| 326 | | | 3.0 + 2 |
| 330 | 2.66645 + 4 | 1.33322 + 2 | 2.6 + 2 |
| 333 | | | 2.8 + 2 |
| 336 | | | 3.0 + 2 |
| 340 | | 2.66645 + 2 | 2.6 + 2 |
| 343 | | | 2.8 + 2 |
| 346 | | | 3.0 + 2 |
| 350 | | 3.99967 + 2 | 2.6 + 2 |
| 353 | | | 2.8 + 2 |
| 356 | | | 3.0 + 2 |
| 360 | 3.33306 + 4 | 1.33322 + 2 | 2.6 + 2 |
| 363 | | | 2.8 + 2 |
| 366 | | | 3.0 + 2 |
| 370 | | 2.66645 + 2 | 2.6 + 2 |
| 373 | | | 2.8 + 2 |
| 376 | | | 3.0 + 2 |
| 380 | | 3.99967 + 2 | 2.6 + 2 |
| 383 | | | 2.8 + 2 |
| 386 | | | 3.0 + 2 |

For each case listed in Table 2, three possible $x_{r1}$ values are used, $$x_{r1} = x_B, \; x_B + \frac{1}{3}(x_f - x_B), \; x_b + \frac{2}{3}(x_f - x_B)$$

where $x_B$ is the preferred value. Solutions for a total of 81 cases were generated.

Case 353 in Table 2 was chosen as the aforementioned nominal case, where $$p_o = 200 \text{ Torr}, \; p_f = 3 \text{ Torr}, \; T_o = 280 \text{ K}$$

These nominal values are not considered to be minimums, maximums, or optimum values and may be adjusted according to the desired scale of the system. Results for this case are given in Table 3 and the wall shape is shown in FIG. 6.

TABLE 3

Nominal Case Results

| | |
|---|---|
| $M_{B'}$ = | 1.46 |
| $M_f$ = | 3.41 |
| $\theta^*$ = | 46.2° |
| $(x_f - x_i)/y_i$ = | 30.3 |
| $y_f/y_i$ = | 6.94 |
| $\dot{m}$ = | 0.790 kg/s (for h = 1 m) |
| Re = | 6.38 × 10⁴ |
| $\beta_{min}$ = | 0.189 (at B') |
| $\beta_{max}$ = | 1.07 (at C') |
| $\delta^*(B')$ = | 3.20 × 10⁻⁵ m |
| $\delta^*(C')$ = | 1.60 × 10⁻³ m |

For the nominal case, the nozzle 12 has the conditions:

$$M_b = M_f = 3.41, \; \frac{x_i}{y_i} = 0.9601, \; \frac{x_B}{y_i} = 8.617, \; \frac{x_f}{y_i} = 31.22,$$

$$p_B = p_f = 3 \text{ Torr}$$

The nozzle exit Mach number is 3.41, while the nozzle length and exit half height are $$x_f - x_i = 0.158 \text{ m}$$

$$y_f = 3.63 \times 10^{-2} \text{ m}$$

while possible strut locations are $$x_{r1} = 4.50 \times 10^{-2} \text{ m}, \; x_{r2} = 8.44 \times 10^{-2} \text{ m}, \; x_{r3} = 1.24 \times 10^{-1} \text{ m}$$

Minimum length nozzles are sometimes quite long and are consequently truncated. However, this is not the case here. A diverging nozzle section as long as about 15.8 cm (6.3 inches), or even up to 50 cm, does not pose a size problem for a high-power laser system, and this length is compatible with the iodine injection scheme. The pressure gradient parameter for wall B'C' is a minimum at B' and has a moderate maximum value at the nozzle exit plane, where the displacement thickness, $\delta^*$, is about 1.6 mm. Thus, $\delta^*(C')/y_f$ is only 0.044, which validates the MLN inviscid design approach.

FIGS. 6(*a*) and 6(*b*) are to-scale drawings of a MLN for the nominal case according to the invention, wherein FIG. 6(*b*) shows nozzle wall points A' and B'. The three, nearly vertical, curves in FIG. 6(*a*) are the three considered locations for the iodine injection strut discussed above. The two downstream strut leading edge shapes, in the simple wave region, are nearly straight. This stems from the slow rate of adjustment of the velocity, to its final value, in the downstream region.

The sensitivity of the nominal case solution to the value of the ratio of specific heats is tested by rerunning this case with a γ value of 1.35. The expected trends occurred, with $M_f$ decreasing to 3.36 and $(x_f - x_i)/y_i$ increasing to 32.3. The magnitude of any change, however, is modest.

For the cases listed in Table 2, the various output parameters of interest have ranges that are shown in Table 4.

TABLE 4

Parameter Value Range

| |
|---|
| $1.46 \leq M_{B'} \leq 1.97$ |
| $3.21 \leq M_f \leq 4.38$ |
| $44.9° \leq \theta^* \leq 46.2°$ |
| $23.8 \leq (x_f - x_i)/y_i \leq 91.3$ |
| $5.76 \leq y_f/y_i \leq 16.6$ |
| $0.0286 \leq \dot{m} \leq 0.0512$ |
| $0.395 \times 10^5 \leq Re \leq 0.886 \times 10^5$ |
| $0.146 \leq \beta_{min} \leq 0.362$ |
| $1.03 \leq \beta_{max} \leq 1.30$ |

The range in values for Re and $\dot{m}$ is largely determined by their linear variation with $p_o$. The change in the two geometrical parameters stems from the rapid variation in the one-dimensional area ratio, $A_f/A^*$, with $M_f$. In general, these two geometrical parameters are sensitive to the value of the pressure ratio, $p_f/p_o$.

An improved nozzle and iodine injection system for a COIL are described according to the invention. It will be understood by those of skill in the art that variations in the components or arrangement of components described may be made within the scope of the invention.

TABLE 5

$C_v(\beta, g_w)$

| β | \multicolumn{11}{c}{$g_w$} |
|---|---|---|---|---|---|---|---|---|---|---|---|
|  | 0.0 | 0.2 | 0.4 | 0.6 | 0.8 | 1.0 | 1.5 | 2.0 | 3.0 | 4.0 | 5.0 |
| SP | 3.4554 | 2.9267 | 2.6691 | 2.5199 | 2.4246 | 2.3580 | 2.2597 | 2.2051 | 2.1473 | 2.1177 | 2.0989 |
| 0.5SP | 1.3383 | 1.3814 | 1.4079 | 1.4615 | 1.5217 | 1.4408 | 1.4499 | 1.4541 | 1.4599 | 1.4594 | 1.4601 |
| 0.00 | 1.2168 | 1.2168 | 1.2168 | 1.2168 | 1.2168 | 1.2168 | 1.2168 | 1.2168 | 1.2168 | 1.2168 | 1.2168 |
| 0.25 | 1.1145 | 1.0767 | 1.0411 | 1.0075 | 0.9756 | 0.9453 | 0.8752 | 0.8119 | 0.7008 | 0.6051 | 0.5207 |
| 0.50 | 1.0529 | 0.9947 | 0.9416 | 0.8926 | 0.8473 | 0.8047 | 0.7085 | 0.6243 | 0.4807 | 0.3605 | 0.2566 |
| 0.75 | 1.0107 | 0.9391 | 0.8749 | 0.8165 | 0.7629 | 0.7135 | 0.6029 | 0.5073 | 0.3467 | 0.2138 | 0.0999 |
| 1.00 | 0.9793 | 0.8979 | 0.8261 | 0.7612 | 0.7023 | 0.6479 | 0.5279 | 0.4250 | 0.2535 | 0.1126 | −0.0076 |
| 1.25 | 0.9549 | 0.8660 | 0.7883 | 0.7187 | 0.6557 | 0.5979 | 0.4711 | 0.3629 | 0.1837 | 0.0373 | −0.0874 |
| 1.50 | 0.9350 | 0.8401 | 0.7577 | 0.6843 | 0.6183 | 0.5580 | 0.4260 | 0.3140 | 0.1290 | −0.0216 | −0.1496 |
| 1.75 | 0.9185 | 0.8186 | 0.7323 | 0.6561 | 0.5875 | 0.5250 | 0.3891 | 0.2740 | 0.0846 | −0.0693 | −0.1999 |
| 2.00 | 0.9044 | 0.8002 | 0.7108 | 0.6321 | 0.5615 | 0.4975 | 0.3582 | 0.2406 | 0.0476 | −0.1089 | −0.2415 |
| 3.00 | 0.8642 | 0.7476 | 0.6493 | 0.5638 | 0.4877 | 0.4190 | 0.2710 | 0.1470 | −0.0553 | −0.2187 | −0.3567 |
| 4.00 | 0.8382 | 0.7133 | 0.6094 | 0.5197 | 0.4403 | 0.3689 | 0.2158 | 0.0881 | −0.1196 | −0.2868 | −0.4279 |
| 5.00 | 0.8196 | 0.6887 | 0.5808 | 0.4881 | 0.4066 | 0.3334 | 0.1769 | 0.0467 | −0.1644 | −0.3342 | −0.4772 |
| 10.00 | 0.7708 | 0.6233 | 0.5050 | 0.4052 | 0.3182 | 0.2408 | 0.0765 | −0.0591 | −0.2780 | −0.4532 | −0.6006 |
| 15.00 | 0.7483 | 0.5924 | 0.4694 | 0.3665 | 0.2772 | 0.1980 | 0.0307 | −0.1070 | −0.3287 | −0.5060 | −0.6550 |
| 20.00 | 0.7347 | 0.5734 | 0.4475 | 0.3428 | 0.2523 | 0.1721 | 0.0032 | −0.1357 | −0.3589 | −0.5372 | −0.6871 |
| 30.00 | 0.7186 | 0.5503 | 0.4211 | 0.3142 | 0.2223 | 0.1411 | −0.0297 | −0.1698 | −0.3946 | −0.5740 | −0.7248 |
| 40.00 | 0.7090 | 0.5363 | 0.4050 | 0.2970 | 0.2042 | 0.1224 | −0.0494 | −0.1901 | −0.4157 | −0.5958 | −0.7470 |
| 50.00 | 0.7024 | 0.5266 | 0.3939 | 0.2851 | 0.1918 | 0.1096 | −0.0628 | −0.2039 | −0.4301 | −0.6105 | −0.7621 |
| 100.00 | 0.6862 | 0.5019 | 0.3659 | 0.2552 | 0.1607 | 0.0777 | −0.0961 | −0.2380 | −0.4654 | −0.6466 | −0.7987 |

TABLE 6

$C_t(\beta, g_w)$

| β | \multicolumn{11}{c}{$g_w$} |
|---|---|---|---|---|---|---|---|---|---|---|---|
|  | 0.0 | 0.2 | 0.4 | 0.6 | 0.8 | 1.0 | 1.5 | 2.0 | 3.0 | 4.0 | 5.0 |
| SP | 2.1374 | 1.9006 | 1.7930 | 1.7328 | 1.6951 | 1.6690 | 1.6310 | 1.6101 | 1.5881 | 1.5767 | 1.5697 |
| 0.5SP | 1.2570 | 1.2723 | 1.2828 | 1.3026 | 1.3252 | 1.2962 | 1.3002 | 1.3023 | 1.3050 | 1.3051 | 1.3056 |
| 0.00 | 1.2168 | 1.2168 | 1.2168 | 1.2168 | 1.2168 | 1.2168 | 1.2168 | 1.2168 | 1.2168 | 1.2168 | 1.2168 |
| 0.25 | 1.1829 | 1.1696 | 1.1572 | 1.1456 | 1.1348 | 1.1246 | 1.1014 | 1.0810 | 1.0463 | 1.0175 | 0.9929 |
| 0.50 | 1.1623 | 1.1418 | 1.1235 | 1.1070 | 1.0918 | 1.0779 | 1.0473 | 1.0214 | 0.9791 | 0.9454 | 0.9175 |
| 0.75 | 1.1479 | 1.1127 | 1.1008 | 1.0813 | 1.0637 | 1.0478 | 1.0135 | 0.9849 | 0.9393 | 0.9036 | 0.8745 |
| 1.00 | 1.1370 | 1.1085 | 1.0840 | 1.0625 | 1.0434 | 1.0262 | 0.9895 | 0.9594 | 0.9119 | 0.8753 | 0.8456 |
| 1.25 | 1.1285 | 1.0973 | 1.0708 | 1.0479 | 1.0276 | 1.0095 | 0.9713 | 0.9402 | 0.8916 | 0.8544 | 0.8244 |
| 1.50 | 1.1215 | 1.0881 | 1.0602 | 1.0361 | 1.0150 | 0.9962 | 0.9569 | 0.9250 | 0.8756 | 0.8381 | 0.8079 |
| 1.75 | 1.1156 | 1.0805 | 1.0512 | 1.0263 | 1.0045 | 0.9852 | 0.9450 | 0.9126 | 0.8627 | 0.8249 | 0.7947 |
| 2.00 | 1.1106 | 1.0739 | 1.0436 | 1.0180 | 0.9956 | 0.9759 | 0.9350 | 0.9023 | 0.8519 | 0.8140 | 0.7837 |
| 3.00 | 1.0959 | 1.0547 | 1.0215 | 0.9938 | 0.9701 | 0.9493 | 0.9066 | 0.8729 | 0.8217 | 0.7835 | 0.7533 |
| 4.00 | 1.0861 | 1.0419 | 1.0069 | 0.9780 | 0.9534 | 0.9320 | 0.8884 | 0.8542 | 0.8027 | 0.7645 | 0.7344 |
| 5.00 | 1.0791 | 1.0325 | 0.9962 | 0.9665 | 0.9413 | 0.9195 | 0.8754 | 0.8410 | 0.7893 | 0.7512 | 0.7212 |
| 10.00 | 1.0599 | 1.0071 | 0.9674 | 0.9356 | 0.9092 | 0.8865 | 0.8413 | 0.8065 | 0.7548 | 0.7171 | 0.6876 |
| 15.00 | 1.0508 | 0.9947 | 0.9535 | 0.9209 | 0.8939 | 0.8710 | 0.8254 | 0.7906 | 0.7391 | 0.7017 | 0.6725 |
| 20.00 | 1.0452 | 0.9870 | 0.9448 | 0.9118 | 0.8846 | 0.8615 | 0.8158 | 0.7810 | 0.7297 | 0.6925 | 0.6635 |
| 30.00 | 1.0384 | 0.9775 | 0.9343 | 0.9007 | 0.8732 | 0.8500 | 0.8042 | 0.7695 | 0.7185 | 0.6816 | 0.6528 |
| 40.00 | 1.0344 | 0.9717 | 0.9278 | 0.8940 | 0.8664 | 0.8431 | 0.7973 | 0.7626 | 0.7118 | 0.6751 | 0.6465 |
| 50.00 | 1.0316 | 0.9677 | 0.9234 | 0.8893 | 0.8616 | 0.8383 | 0.7925 | 0.7579 | 0.7072 | 0.6706 | 0.6422 |
| 100.00 | 1.0241 | 0.9569 | 0.9117 | 0.8772 | 0.8494 | 0.8261 | 0.7803 | 0.7460 | 0.6958 | 0.6596 | 0.6315 |

TABLE 7

$f_w''(\beta, g_w)$

| β | \multicolumn{11}{c}{$g_w$} |
|---|---|---|---|---|---|---|---|---|---|---|---|
|  | 0.0 | 0.2 | 0.4 | 0.6 | 0.8 | 1.0 | 1.5 | 2.0 | 3.0 | 4.0 | 5.0 |
| SP | 0.0001 | 0.0001 | 0.0001 | 0.0001 | 0.0000 | 0.0002 | 0.0000 | 0.0000 | 0.0000 | 0.0002 | 0.0000 |
| 0.5SP | 0.4063 | 0.3743 | 0.3525 | 0.3178 | 2.2812 | 0.3203 | 0.3089 | 0.3024 | 0.2942 | 0.2918 | 0.2896 |
| 0.00 | 0.4696 | 0.4696 | 0.4696 | 0.4696 | 0.4696 | 0.4696 | 0.4696 | 0.4696 | 0.4696 | 0.4696 | 0.4696 |
| 0.25 | 0.5344 | 0.5757 | 0.6161 | 0.6555 | 0.6941 | 0.7319 | 0.8283 | 0.9121 | 1.0805 | 1.2399 | 1.3924 |
| 0.50 | 0.5811 | 0.6550 | 0.7262 | 0.7952 | 0.8623 | 0.9277 | 1.0849 | 1.2348 | 1.5177 | 1.7836 | 2.0366 |
| 0.75 | 0.6181 | 0.7198 | 0.8173 | 0.9112 | 1.0021 | 1.0904 | 1.3019 | 1.5026 | 1.8799 | 2.2332 | 2.5686 |
| 1.00 | 0.6489 | 0.7755 | 0.8963 | 1.0122 | 1.1241 | 1.2326 | 1.4916 | 1.7367 | 2.1963 | 2.6259 | 3.0332 |
| 1.25 | 0.6754 | 0.8249 | 0.9668 | 1.1027 | 1.2336 | 1.3603 | 1.6622 | 1.9473 | 2.4810 | 2.9792 | 3.4511 |
| 1.50 | 0.6987 | 0.8695 | 1.0310 | 1.1854 | 1.3338 | 1.4772 | 1.8185 | 2.1403 | 2.7420 | 3.3031 | 3.8342 |
| 1.75 | 0.7196 | 0.9104 | 1.0903 | 1.2618 | 1.4266 | 1.5857 | 1.9636 | 2.3196 | 2.9845 | 3.6039 | 4.1900 |
| 2.00 | 0.7386 | 0.9483 | 1.1456 | 1.3334 | 1.5135 | 1.6872 | 2.0996 | 2.4877 | 3.2118 | 3.8859 | 4.5236 |
| 3.00 | 0.8013 | 1.0790 | 1.3382 | 1.5836 | 1.8182 | 2.0439 | 2.5781 | 3.0793 | 4.0121 | 4.8790 | 5.6980 |
| 4.00 | 0.8502 | 1.1874 | 1.5003 | 1.7954 | 2.0769 | 2.3473 | 2.9857 | 3.5836 | 4.6946 | 5.7257 | 6.6992 |
| 5.00 | 0.8907 | 1.2816 | 1.6427 | 1.9824 | 2.3056 | 2.6158 | 3.3469 | 4.0307 | 5.2998 | 6.4765 | 7.5869 |
| 10.00 | 1.0308 | 1.6422 | 2.1980 | 2.7162 | 3.2066 | 3.6752 | 4.7751 | 5.7995 | 7.6948 | 9.4477 | 11.0994 |

TABLE 7-continued $f_w''(\beta, g_w)$      $g_w$

| β | 0.0 | 0.2 | 0.4 | 0.6 | 0.8 | 1.0 | 1.5 | 2.0 | 3.0 | 4.0 | 5.0 |
|---|---|---|---|---|---|---|---|---|---|---|---|
| 15.00 | 1.1231 | 1.9114 | 2.6208 | 3.2789 | 3.8996 | 4.4915 | 5.8774 | 7.1656 | 9.5449 | 11.7428 | 13.8125 |
| 20.00 | 1.1935 | 2.1349 | 2.9757 | 3.7528 | 4.4843 | 5.1807 | 6.8089 | 8.3203 | 11.1091 | 13.6833 | 16.1063 |
| 30.00 | 1.2997 | 2.5045 | 3.5688 | 4.5472 | 5.4655 | 6.3382 | 8.3744 | 10.2614 | 13.7387 | 16.9457 | 19.9628 |
| 40.00 | 1.3805 | 2.8124 | 4.0670 | 5.2164 | 6.2930 | 7.3148 | 9.6959 | 11.9002 | 15.9592 | 19.7006 | 23.2193 |
| 50.00 | 1.4463 | 3.0815 | 4.5051 | 5.8057 | 7.0221 | 8.1755 | 10.8611 | 13.3453 | 17.9173 | 22.1299 | 26.0911 |
| 100.00 | 1.6701 | 4.1255 | 6.2186 | 8.1158 | 9.8829 | 11.5545 | 15.4370 | 19.0214 | 25.6091 | 31.6733 | 37.3727 |

The invention claimed is:

1. An iodine injection system for injecting iodine into a chemical oxygen-iodine laser, the system comprising:
    a nozzle having a central axis of symmetry and pair of opposed curved walls defining an area for gas flow there between, the nozzle including:
        (a) an inlet defined by the pair of opposed curved walls;
        (b) a throat located downstream from the inlet and defined by convergence of the pair of opposed curved walls, from the inlet to a pair of opposite sharp corners, at a point of closest convergence of the opposed walls;
        (c) an exit nozzle portion having divergently extending portions of the pair of opposed curved walls extending from the sharp corners of the throat, the divergent extending portions of the pair of opposed walls terminating at a nozzle exit end; and
    at least one curved strut located within the nozzle, the curved strut upstream of an exit plane and downstream of the throat; and
    a plurality of orifices arrayed along the at least one curved strut, each orifice directed away from the throat of the nozzle toward the nozzle exit end and each orifice injecting iodine toward the nozzle exit end.

2. The iodine injection system according to claim 1 further comprising a kernel region in the nozzle, the at least one curved strut located downstream from the kernel region.

3. The iodine injection system of claim 2 wherein a downstream edge of the kernel region is located between 10% to 50% of the distance from the throat to the exit plane.

4. The iodine injection system of claim 1 wherein the strut is located within 20% to 90% of the distance between the nozzle throat and the exit plane.

5. The iodine injection system according to claim 1 further comprising a carrier gas into which iodine is injected.

6. The iodine injection system according to claim 5 wherein the carrier gas is helium.

7. The iodine injection system according to claim 5 wherein the carrier gas is nitrogen.

8. The iodine injection system according to claim 1 wherein the strut further comprises a heating element.

9. The iodine injection system according to claim 1 further comprising gas flowing through the nozzle, the gas comprising oxygen.

10. An iodine injection system for injecting iodine into a chemical oxygen-iodine, the system comprising:
    a nozzle comprising a nozzle body having an inlet portion, an outlet portion, and a throat, the throat located downstream from the inlet portion and defined by convergence of a pair of opposed curved walls, from an inlet to a pair of opposite sharp corners, at a point of closest convergence of the opposed curved walls, the inlet portion at one end of the throat, and the outlet portion at an opposite end of the throat, the outlet portion bounded by opposed continuous convex walls of diminishing curvature as a wall distance from the throat increases, curvature of the walls approaching a straight line at a terminal end of the outlet portion;
    at least one curved injection strut located within the outlet portion of the nozzle and downstream of the throat; and
    a plurality of orifices arrayed on the at least one curved strut, each orifice oriented to inject iodine away from the throat and toward an exit plane of the nozzle.

11. The iodine injection system according to claim 10 wherein the nozzle has a kernel region and the strut is located downstream from an end of the kernel region.

12. The iodine injection system of claim 11 wherein a downstream edge of the kernel region is located between 10% to 50% of the distance from the throat to the exit plane.

13. The iodine injection system of claim 10 wherein the strut is located within 20% to 90% of the distance between the nozzle throat and the exit plane.

14. The iodine injection system according to claim 10 further comprising a carrier gas injected with iodine through the plurality of orifices.

15. The iodine injection system according to claim 14 wherein the carrier gas is helium.

16. The iodine injection system according to claim 14 wherein the carrier gas is nitrogen.

17. The iodine injection system according to claim 10 wherein the strut further comprises a heating element.

18. The iodine injection system according to claim 10 further comprising a gas including oxygen flowing through the nozzle.

19. An iodine injection system for injecting iodine into a chemical oxygen-iodine laser, the system comprising:
    a two dimensional nozzle comprising a nozzle body having a throat, the nozzle having an inlet portion at one end of the throat, and an outlet portion with an exit plane at an opposite end of the throat, the outlet portion bounded by opposed continuous convex walls of diminishing curvature as a wall distance from the throat increases, curvature of the walls approaching a straight line at a terminal end of the outlet portion, the throat located downstream from the inlet portion and defined by a pair of opposed curved walls, said walls converging from an inlet to a pair of opposed sharp corners at a point of closest convergence of the opposed curved walls;
    a kernel region of the nozzle located between 10% to 50% of the distance from the throat to the exit plane of the nozzle;
    at least one curved injection strut located within the outlet portion of the nozzle, downstream of the throat, and between 20% to 90% of the distance from the throat to the exit plane; and
    a plurality of orifices arrayed on the at least one curved injection strut, each orifice oriented to inject gas away from the throat and toward the exit plane of the nozzle.

* * * * *